US011391526B2

(12) United States Patent
Hirata et al.

(10) Patent No.: US 11,391,526 B2
(45) Date of Patent: Jul. 19, 2022

(54) HEAT-TRANSMITTING MODIFIER FOR ELASTOMER, HEAT-TRANSMISSION-MODIFIED CRYSTALLINE ELASTOMER, METHOD FOR USING CRYSTALLINE POLYMER AND PRECURSOR THEREOF, METHOD FOR HEAT-TRANSMISSION MODIFICATION OF ELASTOMER, HEATER BODY, AND HEATED BODY

(71) Applicant: I.S.T CORPORATION, Shiga (JP)

(72) Inventors: Shunsuke Hirata, Shiga (JP); Yoji Tani, Shiga (JP)

(73) Assignee: I.S.T CORPORATION, Shiga (JP)

(*) Notice: Subject to any disclaimer, the term of this patent is extended or adjusted under 35 U.S.C. 154(b) by 219 days.

(21) Appl. No.: 16/842,394

(22) Filed: Apr. 7, 2020

(65) Prior Publication Data
US 2020/0232728 A1 Jul. 23, 2020

Related U.S. Application Data

(63) Continuation of application No. 15/400,492, filed on Jan. 6, 2017, now abandoned, which is a continuation of application No. PCT/JP2015/072323, filed on Aug. 6, 2015.

(30) Foreign Application Priority Data

Aug. 11, 2014 (JP) .................. 2014-163881

(51) Int. Cl.
*F28F 1/00* (2006.01)
*F28F 13/18* (2006.01)
*C08L 101/00* (2006.01)
*G03G 15/20* (2006.01)
*C08L 83/06* (2006.01)
*C09K 5/14* (2006.01)
*C08G 77/38* (2006.01)
*F28F 21/06* (2006.01)
*C08G 77/12* (2006.01)
*C08G 77/20* (2006.01)

(52) U.S. Cl.
CPC .............. *F28F 13/18* (2013.01); *C08G 77/38* (2013.01); *C08L 83/06* (2013.01); *C08L 101/00* (2013.01); *C09K 5/14* (2013.01); *F28F 1/00* (2013.01); *F28F 21/062* (2013.01); *G03G 15/20* (2013.01); *G03G 15/2057* (2013.01); *C08G 77/12* (2013.01); *C08G 77/20* (2013.01); *G03G 2215/2025* (2013.01); *G03G 2215/2035* (2013.01); *Y10T 428/1352* (2015.01); *Y10T 428/1386* (2015.01); *Y10T 428/1393* (2015.01)

(58) Field of Classification Search
CPC ....... F28F 1/00; F28F 13/18; Y10T 428/1393; Y10T 428/1386; Y10T 428/1352

USPC .......................................... 428/447
See application file for complete search history.

(56) References Cited

U.S. PATENT DOCUMENTS

| 4,358,391 | A | 11/1982 | Finkelmann et al. |
| 4,388,453 | A * | 6/1983 | Finkelmann ......... C09K 19/408 |
| | | | 252/299.01 |
| 5,385,690 | A * | 1/1995 | Finkelmann ............ B29C 67/24 |
| | | | 252/299.01 |
| 5,693,253 | A | 12/1997 | Ohnishi et al. |
| 6,162,481 | A | 12/2000 | Bernacchi et al. |
| 6,261,481 | B1 | 7/2001 | Akatsuka |
| 6,361,724 | B1 | 3/2002 | Maeda |
| 6,423,128 | B1 | 7/2002 | Amberg-Schwab et al. |
| 7,122,229 | B1 | 10/2006 | Camacho-Lopez et al. |
| 7,638,183 | B2 * | 12/2009 | Kim ..................... G03G 15/162 |
| | | | 428/212 |
| 8,956,548 | B2 | 2/2015 | Clapp et al. |
| 2003/0050374 | A1 | 3/2003 | Kamo |

(Continued)

FOREIGN PATENT DOCUMENTS

| JP | 56-079173 | 6/1981 |
| JP | 64-086338 | 3/1989 |

(Continued)

OTHER PUBLICATIONS

International Search Report (English and Japanese) and Written Opinion of International Application No. PCT/JP2015/072323, dated Sep. 8, 2015, total 19 pages.

(Continued)

*Primary Examiner* — Margaret G Moore
(74) *Attorney, Agent, or Firm* — Hamre, Schumann, Mueller & Larson, P.C.

(57) ABSTRACT

The present invention brings about an increase in the thermal conductivity of an elastomer molded article over a preexisting value. The method according to the present invention is a method that uses at least one of a liquid crystalline polymer and a precursor therefor as a thermal conductivity modifier for an elastomer. That is, the thermal conductivity modifier for an elastomer according to the present invention contains at least one of a liquid crystalline polymer and a precursor therefor. The thermal conductivity modifier may contain only at least one of a liquid crystalline polymer and a precursor therefor or may contain at least one of a liquid crystalline polymer and a precursor therefor along with an additional component. The method and thermal conductivity modifier according to the present invention can bring about an increase in the thermal conductivity of an elastomer molded article over a preexisting value.

12 Claims, 10 Drawing Sheets

(56) References Cited

U.S. PATENT DOCUMENTS

| | | | |
|---|---|---|---|
| 2004/0087697 | A1 | 5/2004 | Tobita et al. |
| 2004/0102597 | A1 | 5/2004 | Tobita et al. |
| 2006/0291924 | A1 | 12/2006 | Jeong et al. |
| 2007/0009817 | A1* | 1/2007 | Kim ............ G03G 15/162 430/56 |
| 2008/0030957 | A1 | 2/2008 | Abul-Haj et al. |
| 2012/0128953 | A1* | 5/2012 | Kuraoka ............ B32B 5/145 428/215 |
| 2012/0319806 | A1 | 12/2012 | Mills et al. |
| 2014/0183420 | A1* | 7/2014 | Kamoi ............ G03G 15/0189 252/511 |
| 2014/0205329 | A1* | 7/2014 | Inoue ............ G03G 15/161 399/307 |

FOREIGN PATENT DOCUMENTS

| | | |
|---|---|---|
| JP | 1-134425 | 5/1989 |
| JP | H11323162 | 11/1999 |
| JP | 2003268070 | 9/2003 |
| JP | 2004149722 | 5/2004 |
| JP | 2004149723 | 5/2004 |
| JP | 2004175926 | 6/2004 |
| JP | 2004256687 | 9/2004 |
| JP | 2006265527 | 10/2006 |
| JP | 2007-045759 | 2/2007 |
| JP | 2011084715 | 4/2011 |
| JP | 2011233608 | 11/2011 |
| JP | 2011236376 | 11/2011 |
| JP | 2012144595 | 8/2012 |
| JP | 2013130712 | 7/2013 |

OTHER PUBLICATIONS

Yao Ning et.al. and Electrorheological Behavior of Side-Chain Liquid-CrystallinePolysiloxanes in Nematic. In Solvents, Macromolesules, and 1997,30, p. 5822-5831.

Finkelmann. H. et.al, Liquid Crystalline Polymers With Amphiphilic and Non Amphiphilic Side Chain-Effect of the Main Chain on the Phase Behaviour Liquid Crystals and Ordered Fluids, 1984, vol. 4, p. 715-726.

Hempenius Mark A. et.al., Well-defined side-chain liquid-crystalline polysiloxanes, Macromol.Rapid Commun., 1996, 17, p. 299-303.

Gray, G.W. et.al., and 29Si N.M.R. investigations of polysiloxanes, Liquid Crystals, Nov. 1989, vol. 6, No. 5, p. 503-513, especially p. 507-512.

Kostromin and S.G. et.al., Comb-shaped liquid-crystalline polysiloxanes with cyanodiphenyl mesogenic groups, and Vysokomolekulyamye. Soedineniya, Seriya A, 1991, vol. 33, No. 5, and p. 1115-1119, especially p. 1116-1117—An explanation of relevance can be found in the English Translation of the Japanese Office Action dated Mar. 21, 2017.

Kyung-Min. Kim et.al. and Synthesis. In and characterization of liquid-crystalline silsesquioxanes, Polymer Bulletin, and 2001, with restriction of vol. 46, No. 1, and p. 15-21.

Office Action issued in corresponding Japanese Patent Application No. 2016-542550, dated Nov. 22, 2016, 7 pages with a machine translation.

Office Action issued in corresponding Japanese Patent Application No. 2016-542550, dated Mar. 21, 2017, 6 pages with a machine translation.

* cited by examiner

HEAT-TRANSMITTING MODIFIER FOR ELASTOMER, HEAT-TRANSMISSION-MODIFIED CRYSTALLINE ELASTOMER, METHOD FOR USING CRYSTALLINE POLYMER AND PRECURSOR THEREOF, METHOD FOR HEAT-TRANSMISSION MODIFICATION OF ELASTOMER, HEATER BODY, AND HEATED BODY

TECHNICAL FIELD

The present invention relates to a thermal conductivity modifier for an elastomer, a thermal conductivity-modified liquid crystalline elastomer, a method of using a liquid crystalline polymer and a precursor therefor, and a method of modifying the thermal conductivity of an elastomer. The present invention further relates to a heater body and a heated body that utilize a thermal conductivity modifier for an elastomer and a thermal conductivity-modified liquid crystalline elastomer.

BACKGROUND

The method of adding a thermally conductive filler to an elastomer is already widely known as one example of a procedure for obtaining a highly thermally conductive elastomer molded article. Specifically, such a method has been used in the past as a procedure for forming an elastic layer on an endless belt for the fixing of color toners (for example, refer to Japanese Patent Application Laid-open No. 2013-130712).

CITATION LIST

Patent Literature

[PTL 1] Japanese Patent Application Laid-open No. 2013-130712

SUMMARY

Technical Problem

In the preparation of a highly thermally conductive elastomer molded article, larger amounts of addition of the thermally conductive filler to the elastomer result in a greater increase in the thermal conductivity of the elastomer molded article. However, the elasticity of the elastomer molded article is lost when this amount of addition becomes too large. Accordingly, when at least a certain level of elasticity is required of an elastomer molded article, the amount of addition of the thermally conductive filler is then inevitably constrained. Due to this, it is quite difficult, using just the method of simply adding a thermally conductive filler to an elastomer, to increase the thermal conductivity of elastomer molded articles than before. However, it is under these circumstances that additional increases in the thermal conductivity of elastomer molded articles are being expected from the standpoint of, for example, energy savings. Considering these current circumstances, the invention brings about an increase in the thermal conductivity of elastomer molded articles over preexisting values.

Solution to Problem

The method according to a first aspect of the present invention is a method that uses at least one of a liquid crystalline polymer and a precursor therefor as a thermal conductivity modifier for elastomers. That is, at least one of a liquid crystalline polymer and a precursor therefor is encompassed by the thermal conductivity modifier for elastomers according to the first aspect of the present invention. The "elastomer" referenced here is a rubber or a thermoplastic elastomer and preferably is a silicone rubber. In addition, the liquid crystalline polymer may be a main chain type or a side chain type or a composite type, but side chain types are preferred. The liquid crystalline polymer is also preferably a polysiloxane-based polymer that has a mesogenic group. When the liquid crystalline polymer is a side chain type, the main chain of the liquid crystalline polymer is then a polysiloxane-based polymer. In this case, the "precursor therefor" is, for example, a mixture of a polysiloxane-based polymer and a mesogen compound capable of reacting with this polysiloxane-based polymer. This liquid crystalline polymer also preferably exhibits a smectic phase or a nematic phase. The mesogenic group constituting this liquid crystalline polymer is preferably at least one mesogenic group selected from the group consisting of (4-methoxyphenyl)-4-pent-4-enoxybenzoate, (4-cyanophenyl)-4-pent-4-enoxybenzoate, 4-cyano-4'-(4-pent-4-enoxy)-1,1'-biphenyl, (4-nitrophenyl)-4-pent-4-enoxybenzoate, 4-biphenyl [4'-(4-pent-4-enoxy)]benzoate, and 4'-cyano-4-biphenyl-4-pent-4-enoxybenzoate, wherein at least one mesogenic group selected from the group consisting of (4-methoxyphenyl)-4-pent-4-enoxybenzoate, (4-cyanophenyl)-4-pent-4-enoxybenzoate, and 4-cyano-4'-pent-4-enoxy-1,1'-biphenyl is more preferred. The mesogenic group introduction ratio is also preferably in the range of at least 20 mass % and not more than 70 mass %. The thermal conductivity modifier preferably has at least one of a liquid crystalline polymer and a precursor therefor as its major component and is more preferably constituted of only a liquid crystalline polymer or precursor therefor. Moreover, this thermal conductivity modifier for resins may be used by adding it to the elastomer or a starting material therefor or may be used as a starting material for the elastomer.

As a result of intensive investigations by the present inventors, it was demonstrated that an increase in the thermal conductivity of elastomer molded articles over preexisting values could be brought about when at least one of a liquid crystalline polymer and a precursor therefor was used as a thermal conductivity modifier for elastomers. As a consequence, the method and thermal conductivity modifier according to the first aspect of the present invention can bring about an increase in the thermal conductivity of elastomer molded articles over preexisting values.

The method according to a second aspect of the present invention is a method of modifying the thermal conductivity of an elastomer by introducing a mesogenic group into starting material for the elastomer. The additional details for this method are the same as the additional details for the method according to the first aspect.

The method according to a third aspect of the present invention is a method of modifying the thermal conductivity of an elastomer by adding at least one of a liquid crystalline polymer and a precursor therefor to starting material for the elastomer. The additional details for this method are the same as the additional details for the method according to the first aspect.

The liquid crystalline elastomer (i.e., an elastomer molded article) according to a fourth aspect of the present invention preferably has a thermal conductivity of at least 0.21 W/m·K. In addition, this liquid crystalline elastomer preferably has a JIS-A hardness in the range of at least 3 degrees and not more than 50 degrees.

The heater body according to a fifth aspect of the present invention is provided with a heating part and an elastic part. The "heater body" indicated here is, for example, a resistance-heating composite tubular article (resistance-heating fixing tube and so forth) or an induction-heating composite tubular article (induction-heating fixing tube and so forth). The elastic part is formed from an elastomer that exhibits liquid crystallinity. The elastomer that exhibits liquid crystallinity preferably exhibits a smectic phase or a nematic phase. In addition, this elastic part is provided on at least a portion of the heating part. The elastic part is preferably filled with a thermally conductive filler.

As a result of intensive investigations by the present inventors, it was found that an elastic part formed from an elastomer that exhibited liquid crystallinity had a higher thermal conductivity than conventional elastic parts formed from elastomers that did not exhibit liquid crystallinity. Due to this, this heater body can emit heat to the outside more efficiently than a conventional heater body.

When the heater body is a seamless heating composite tubular article, the heating part is then a heating layer and the elastic part is an elastic layer. In addition, when the seamless heating composite tubular article in this case is a seamless induction-heating composite tubular article, the heating layer is then an induction heating layer. In this case also, the elastic layer preferably has a JIS-A hardness in the range of at least 3 degrees and not more than 50 degrees. The "elastomer that exhibits liquid crystallinity" in this heater body preferably has the same characteristics as the previously described liquid crystalline polymer and liquid crystalline elastomer.

The heated body according to a fifth aspect of the present invention is provided with a base part and an elastic part. The "heated body" indicated here is, for example, a fixing tube; a cushion sheet for flexible printed boards; a thermally conductive composite sheet used for heat dissipation and disposed between a heat-generating component and a heat-dissipating component in an electronic device; a thermally conductive composite sheet disposed between a metal thermocompression tool and a flexible printed board; a thermally conductive material for heat dissipation for heat-generating electronic-electric components, e.g., power transistors, MOS transistors, FETs, thyristors, rectifiers, transformers, and so forth; and electromagnetic wave absorbers. The elastic part is formed from an elastomer that exhibits liquid crystallinity. The elastomer that exhibits liquid crystallinity preferably exhibits a smectic phase or a nematic phase. This elastic part is disposed over at least a portion of the base part. The elastic part is preferably filled with a thermally conductive filler.

As a result of intensive investigations by the present inventors, it was found that an elastic part formed from an elastomer that exhibited liquid crystallinity had a higher thermal conductivity than a conventional elastic part formed from an elastomer that did not exhibit liquid crystallinity. As a consequence, this heated body can absorb or transmit heat more efficiently than a conventional heated body.

When the heated body is a seamless composite tubular article, the base part is then a base layer and the elastic part is an elastic layer. Also in this case, the elastic layer preferably has a JIS-A hardness in the range of at least 3 degrees and not more than 50 degrees. Moreover, the "elastomer that exhibits liquid crystallinity" in this heated body preferably has the same characteristics as the previously described liquid crystalline polymer and liquid crystalline elastomer.

BRIEF DESCRIPTION OF DRAWINGS

FIG. 1 is an exterior perspective diagram of a seamless fixing tubular article according to a first application example of a thermal conductivity modifier for elastomers according to an embodiment of the present invention.

FIG. 2 is a front view of the seamless fixing tubular article according to the first application example of a thermal conductivity modifier for elastomers according to an embodiment of the present invention.

FIG. 3 is a cross-sectional view at A-A in FIG. 2.

FIG. 4 is a schematic diagram of an image fixing apparatus that incorporates the seamless fixing tubular article according to the first application example of a thermal conductivity modifier for elastomers according to an embodiment of the present invention.

FIG. 5 is a side view of a seamless resistance-heating fixing tubular article according to a second application example of a thermal conductivity modifier for elastomers according to an embodiment of the present invention.

FIG. 6 is a vertical cross-sectional view of the center of the seamless resistance-heating fixing tubular article according to the second application example of a thermal conductivity modifier for elastomers according to an embodiment of the present invention.

FIG. 7 is a cross-sectional view at B-B in FIG. 5.

FIG. 8 is a schematic diagram of an image fixing apparatus that incorporates the seamless resistance-heating fixing tubular article according to the second application example of a thermal conductivity modifier for elastomers according to an embodiment of the present invention.

FIG. 9 is a cross-sectional view at C-C in FIG. 8.

FIG. 10 is a vertical cross-sectional view of the center of a seamless induction-heating fixing tubular article according to a third application example of a thermal conductivity modifier for elastomers according to an embodiment of the present invention.

FIG. 11 is a schematic diagram of an image fixing apparatus that incorporates the seamless induction-heating fixing tubular article according to the third application example of a thermal conductivity modifier for elastomers according to an embodiment of the present invention.

DESCRIPTION OF EMBODIMENTS

Figure 1:
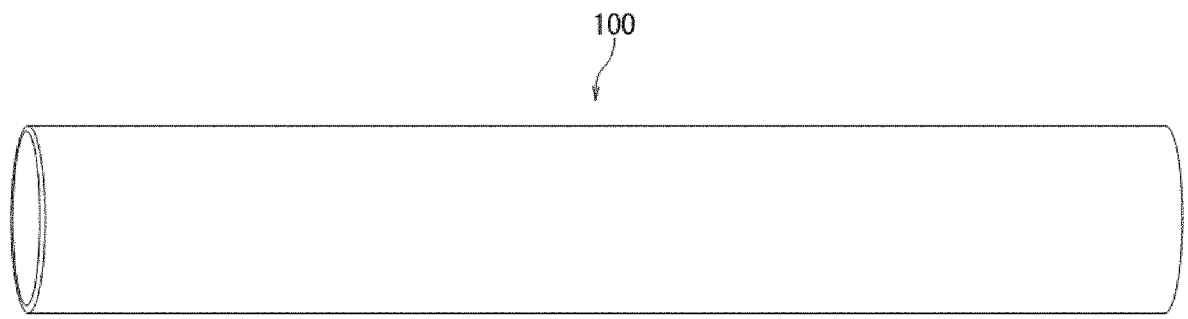
FIG. 1

The method according to an embodiment of the present invention is a method that uses at least one of a liquid crystalline polymer and a precursor therefor as a thermal conductivity modifier for an elastomer (referred to below as an "elastomer thermal conductivity modifier"). That is, the elastomer thermal conductivity modifier according to an embodiment of the present invention is a liquid crystalline polymer itself, a precursor itself for a liquid crystalline polymer, or a mixture of a liquid crystalline polymer and a precursor therefor, or a composition that contains at least one of a liquid crystalline polymer and a precursor therefor. Thus, this elastomer thermal conductivity modifier can be used by adding it to an elastomer or starting material therefor. In addition, when the liquid crystalline polymer (including conversions from the precursor) has elastomeric properties, the elastomer thermal conductivity modifier may be used as a starting material for an elastomer. The elastomer thermal conductivity modifier and its method of use are described in detail below.

The "elastomer or starting material therefor" that is the target for the addition of the elastomer thermal conductivity modifier is a rubber or thermoplastic elastomer or a starting material for these. The rubber and thermoplastic elastomer are described in detail in the following.

The "rubber" referred to here is, for example, a silicone rubber, isoprene rubber, butadiene rubber, butyl rubber, chloroprene rubber (neoprene rubber), ethylene-propylene rubber, chlorinated polyethylene rubber, styrene-butadiene-based copolymer rubber, methyl methacrylate-butadiene rubber, chloroprene-based rubber, acrylonitrile-butadiene-based copolymer rubber, α,β-unsaturated nitrile-acrylate ester-conjugated diene copolymer rubber, ethylene-vinyl acetate copolymer rubber, chlorosulfonated polyethylene rubber, brominated butyl rubber, acrylic rubber, acrylate ester polymer rubber, fluororubber, epichlorohydrin rubber, nitrile rubber, Titan rubber, urethane rubber, polysulfide rubber, hydrogenated diene-based rubber, or a rubber-modified epoxy resin, or is a block copolymer or graft copolymer that has the preceding as constituent units. A single one of these rubbers may be used by itself or two or more may be used in combination (i.e., "rubber" includes at least one rubber selected from the group consisting of the plurality of rubbers given above). Silicone rubber is preferred in particular among the rubbers referenced above.

In addition, the "thermoplastic elastomer" referenced here can be exemplified by styrene-based thermoplastic elastomers, olefin-based thermoplastic elastomers, ester-based thermoplastic elastomers, urethane-based thermoplastic elastomers, and polyamide-based thermoplastic elastomers. A single one of these thermoplastic elastomers may be used by itself or two or more may be used in combination (i.e., "thermoplastic elastomer" includes at least one thermoplastic elastomer selected from the group consisting of the plurality of thermoplastic elastomers given above).

The styrene-based thermoplastic elastomers can be exemplified by styrene-butadiene-styrene (SBS) copolymer, styrene-isoprene-styrene (SIS) copolymer, styrene-ethylene/propylene-styrene (SEPS) copolymer, styrene-ethylene/butylene-styrene (SEBS) copolymer, styrene-isoprene/butadiene-styrene copolymer, and styrene-ethylene/butylene-styrene copolymer grafted by a maleic anhydride thermoplastic elastomer. A single one of these styrene-based thermoplastic elastomers may be used by itself or two or more may be used in combination (i.e., "styrene-based thermoplastic elastomer" includes at least one styrene-based thermoplastic elastomer selected from the group consisting of the plurality of styrene-based thermoplastic elastomers given above).

The olefin-based thermoplastic elastomers can be exemplified by ethylene-propylene copolymer, ethylene-propylene-diene terpolymer, ethylene-1-butene copolymer, ethylene-butene-diene terpolymer rubber, propylene-1-butene copolymer, ethylene-1-hexene copolymer, propylene-1-hexene copolymer, ethylene-1-octene copolymer, and propylene-1-octene copolymer. A single one of these olefin-based thermoplastic elastomers may be used by itself or two or more may be used in combination (i.e., "olefin-based thermoplastic elastomer" includes at least one olefin-based thermoplastic elastomer selected from the group consisting of the plurality of olefin-based thermoplastic elastomers given above).

The ester-based thermoplastic elastomer can be exemplified by polyetherester copolymer and polyesterester copolymer. A single one of these ester-based thermoplastic elastomers may be used by itself or two or more may be used in combination (i.e., "ester-based thermoplastic elastomer" includes at least one ester-based thermoplastic elastomer selected from the group consisting of the plurality of ester-based thermoplastic elastomers given above).

The urethane-based thermoplastic elastomer can be exemplified by polyester-type polyurethane elastomer, polyether-type polyurethane elastomer, and polycarbonate-type polyurethane elastomer. A single one of these urethane-based thermoplastic elastomers may be used by itself or two or more may be used in combination (i.e., "urethane-based thermoplastic elastomer" includes at least one urethane-based thermoplastic elastomer selected from the group consisting of the plurality of urethane-type thermoplastic elastomers given above).

The polyamide-based thermoplastic elastomer can be exemplified by polyether block amide copolymer, polyetheramide copolymer, and polyesteramide copolymer. A single one of these polyamide-based thermoplastic elastomers may be used by itself or two or more may be used in combination (i.e., "polyamide-based thermoplastic elastomer" includes at least one polyamide-based thermoplastic elastomer selected from the group consisting of the plurality of polyamide-based thermoplastic elastomers given above).

Details of the Elastomer Thermal Conductivity Modifier

As noted above, the elastomer thermal conductivity modifier according to embodiments of the present invention may be a liquid crystalline polymer itself, a precursor itself for a liquid crystalline polymer, a mixture of a liquid crystalline polymer and a precursor therefor, or a composition that contains at least one of a liquid crystalline polymer and a precursor therefor. In the case wherein the elastomer thermal conductivity modifier is a composition that contains, e.g., a liquid crystalline polymer and so forth, preferably the, e.g., liquid crystalline polymer and so forth, is the major component of this composition. The "major component" referenced here refers to the component with the highest mass proportion in this composition, and this mass proportion is preferably at least 50 mass %, more preferably at least 60 mass %, still more preferably at least 70 mass %, particularly preferably at least 80 mass %, and most preferably at least 90 mass %. Liquid crystalline polymers and precursors therefor that can be used in the embodiments of the present invention are described in detail first, followed by a detailed description of, inter alia, the additives that can constitute the composition along with this liquid crystalline polymer and/or precursor therefor.

(1) Liquid Crystalline Polymer and Precursor Therefor

The liquid crystalline polymer is literally a polymer that exhibits liquid crystallinity and may be a main chain type, a side chain type, or a composite type; however, the side chain type is preferred. In embodiments of the present invention, this liquid crystalline polymer preferably exhibits a smectic phase or a nematic phase. This liquid crystalline polymer also preferably has elastomeric properties. Such a liquid crystalline polymer can be exemplified by polysiloxane-based polymers that have a mesogenic group (referred to below as a "liquid crystalline polysiloxane-based polymer").

Such a liquid crystalline polysiloxane-based polymer can be exemplified by liquid crystalline polysiloxane-based polymers having a mesogenic group introduced in terminal position on a polysiloxane-based polymer (refer, for example, to Japanese Patent Application Laid-open No. H1-160986) and liquid crystalline polysiloxane-based polymers having a mesogenic group introduced in side chain position on a polysiloxane-based polymer (refer, for example, to Japanese Patent Application Laid-open No. 2007-45759); however, the latter are preferred from the standpoint of, for example, being able to increase the mesogenic group density. The latter type of liquid crystalline polysiloxane-based polymer (referred to below as "side chain-type liquid crystalline polysiloxane-based polymer") is described in detail in the following. The mesogenic group introduction ratio in the polysiloxane-based polymer is preferably in the range of at least 20 mass % and not more than 70 mass %. When the mesogenic group introduction ratio in the polysiloxane-based polymer is established in this range, there is then no loss in the flexibility of the polysiloxane-based polymer and its thermal conductivity can be effectively raised. This introduction ratio is more preferably in the range of at least 30 mass % and not more than 70 mass %, even more preferably in the range of at least 40 mass % and not more than 70 mass %, and particularly preferably in the range of at least 50 mass % and not more than 70 mass %.

The side chain-type liquid crystalline polysiloxane-based polymer can be obtained, for example, by a hydrosilylation reaction between a polymethylhydrosiloxane (methylhydrogenpolysiloxane) and a vinyl group-containing mesogen compound. There are preferably about 26 to 51 repeat units in the polymethylhydrosiloxane, and its weight-average molecular weight is preferably about 1700 to 3200.

Vinyl group-containing mesogen compounds usable in embodiments of the present invention can be exemplified by the compounds given by chemical formulas (1) to (6) below. The compound given by chemical formula (1) is (4-methoxyphenyl)-4-pent-4-enoxybenzoate; the compound given by chemical formula (2) is (4-cyanophenyl)-4-pent-4-enoxybenzoate; the compound given by chemical formula (3) is 4-cyano-4'-pent-4-enoxy-1,1'-biphenyl; the compound given by chemical formula (4) is (4-nitrophenyl)-4-pent-4-enoxybenzoate; the compound given by chemical formula (5) is 4-biphenyl-pent-4-enoxybenzoate; and the compound given by chemical formula (6) is 4'-cyano-4-biphenyl-4-pent-4-enoxybenzoate.

[C1]

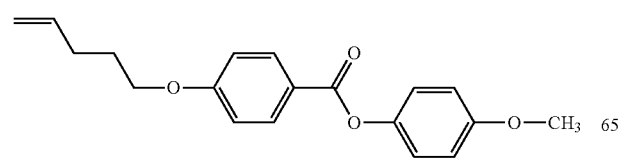
(1)

[C2]

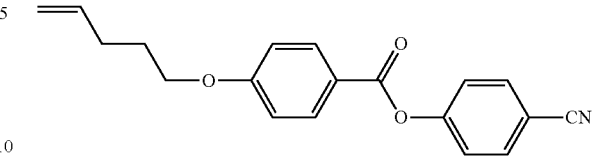
(2)

[C3]

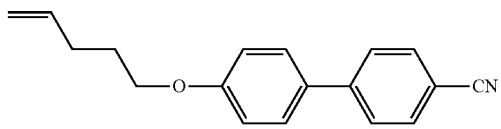
(3)

[C4]

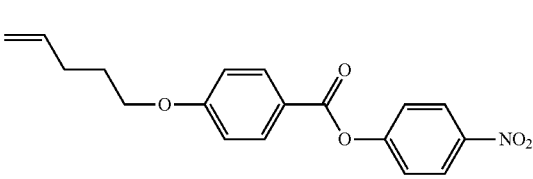
(4)

[C5]

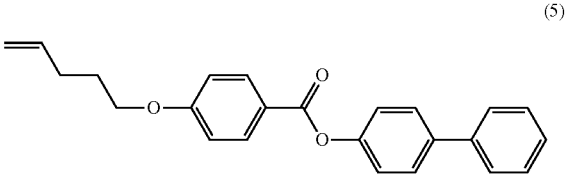
(5)

[C6]

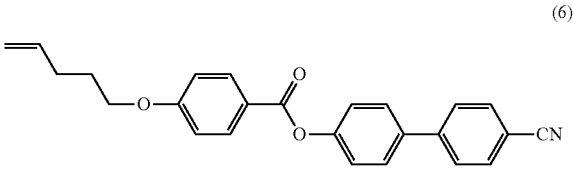
(6)

The precursor for the liquid crystalline polymer is, for example, a mixture of a polymer bearing a reactive functional group and a mesogen compound capable of reacting with this reactive functional group. An example of such a mixture is a mixture of a polymethylhydrosiloxane with a vinyl group-containing mesogen compound capable of undergoing a hydrosilylation reaction with the polymethylhydrosiloxane.

(2) Additives

The additives can be exemplified by compatibilizers, which provide an excellent compatibility with the elastomer that is the target of the addition; thermally conductive fillers for adjusting the thermal conductivity; crosslinking agents for the liquid crystalline polymer; diluents (e.g., polymer diluents); reaction inhibitors; curing auxiliaries; and so forth. The amount of addition of these additives can be determined as appropriate based on, for example, the properties of the final elastomer.

Properties of the Side Chain-Type Liquid Crystalline Polysiloxane-Based Elastomer The side chain-type liquid crystalline polysiloxane-based elastomer yielded by the crosslinking of the aforementioned side chain-type liquid crystalline polysiloxane-based polymer preferably has a thermal conductivity of at least 0.21 W/m·K, more preferably has a thermal conductivity of at least 0.25 W/m·K, even more preferably has a thermal conductivity of at least 0.30 W/m·K, still more preferably has a thermal conductivity of at least 0.35 W/m·K, still more preferably has a thermal conductivity of at least 0.40 W/m·K, and particularly preferably has a thermal conductivity of at least 0.45 W/m·K. Polysiloxane-based elastomers that lack liquid crystallinity generally have a thermal conductivity of about 0.20 W/m·K.

In addition, as for the side chain-type liquid crystalline polysiloxane-based polymer, this side chain-type liquid crystalline polysiloxane-based elastomer preferably exhibits a smectic phase or a nematic phase.

Applications of the Elastomer Thermal Conductivity Modifier>

The elastomer thermal conductivity modifier according to embodiments of the present invention can be applied, for example, to members that are required to exhibit both elasticity and thermal conductivity. Specific application examples thereof are given below for reference.

(1) First Application Example

The elastomer thermal conductivity modifier according to an embodiment of the present invention can be used as a starting material for forming the elastic layer of the seamless fixing belt or seamless fixing tube (collectively referred to below as a "seamless fixing tubular article") used in the image fixing apparatus of a color image-forming apparatus, e.g., a color copier or a color laser printer. Details of this seamless fixing tubular article are given below. This seamless fixing tubular article becomes a target that is heated by a heater, for example, a ceramic heater, disposed in the image fixing apparatus, i.e., it becomes a heated body.

Structure of the Seamless Fixing Tubular Article

Figure 2:
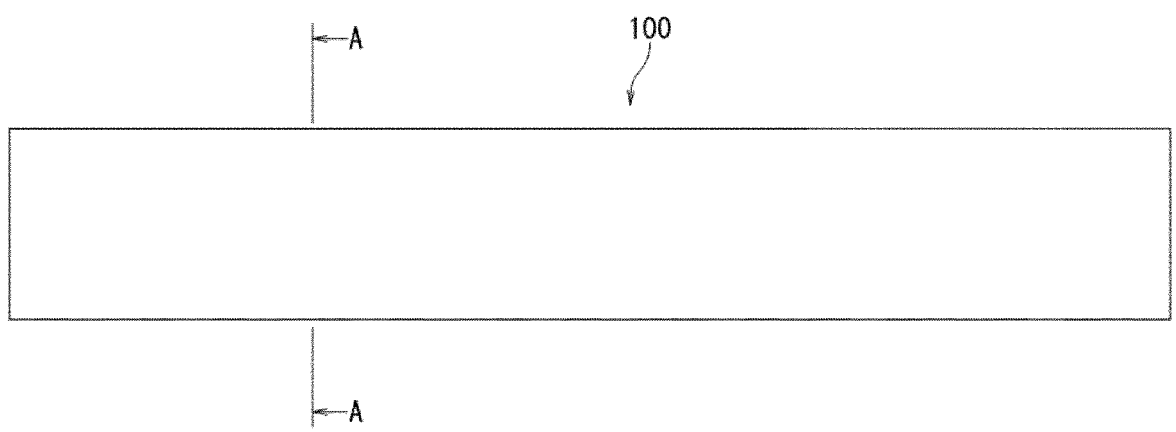
FIG. 2
Figure 3:
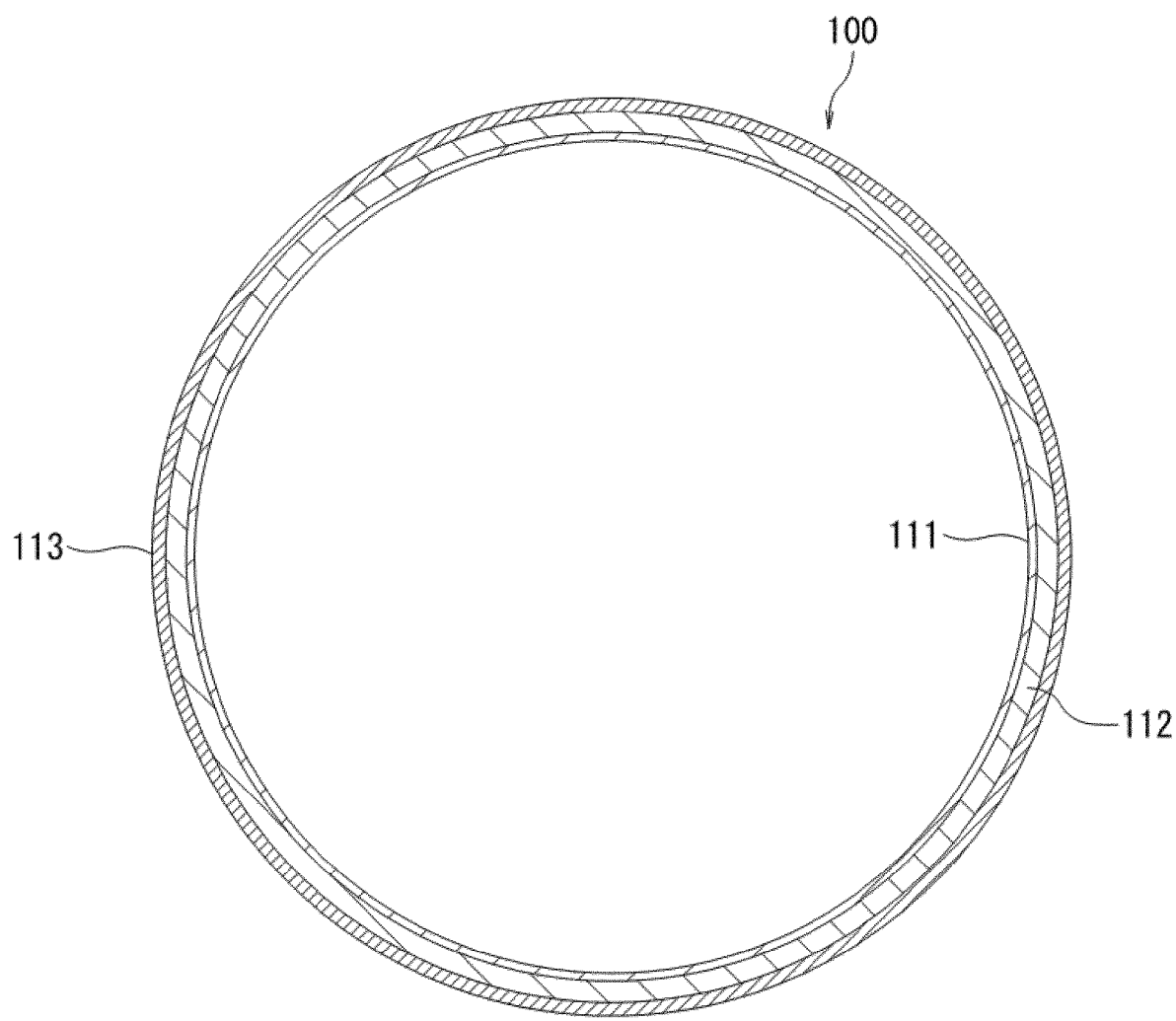
FIG. 3

The seamless fixing tubular article 100 according to this application example is a flexible tubular body and, as shown in FIGS. 1 to 3, is constituted mainly of a base layer 111, an elastic layer 112, and a release layer 113. Details of these layers 111, 112, and 113 are described in the following. Methods for producing such a seamless fixing tubular article 100 are already known, and as a consequence a description thereof is not provided.

(1) Base Layer

The base layer 111 is a seamless tubular layer and is preferably formed from a heat-resistant insulating material that can withstand the temperatures at which the seamless fixing tubular article 100 is used. Examples of such a heat-resistant insulating material are specialty stainless steels and heat-resistant resins. The heat-resistant resins are preferably resins in which the major component is, for example, a polyimide resin or polyamideimide resin, with polyimide resins as such being more preferred. This base layer 111 preferably has mechanical properties that enable it to withstand the movement of the image fixing apparatus. The film thickness of the base layer 111 is preferably at least 30 μm.

(2) Elastic Layer

As indicated above, the elastic layer 112 is formed from an "elastomer containing the elastomer thermal conductivity modifier" or from the "elastomer thermal conductivity modifier itself". This elastic layer 112 preferably has a silicone rubber or a fluororubber as its major component. This elastic layer 112 is preferably soft and has a low hardness. In specific terms, the hardness, for example, as the JIS-A hardness, is preferably in the range of at least 3 degrees and not more than 50 degrees. The thickness of this elastic layer 112 is preferably in the range of at least 100 μm and not more than 500 μm.

(3) Release Layer

The release layer 113 is preferably formed from at least one from the group consisting of fluororesins, silicone rubbers, and fluororubbers. The fluororesins can be exemplified by polytetrafluoroethylene (PTFE), tetrafluoroethylene-perfluoroalkyl vinyl ether copolymer (PFA), and tetrafluoroethylene-hexafluoropropylene copolymer (FEP), and a single one of these may be used by itself or a mixture of these may be used. In the present case, the release layer 113 preferably has a thickness in the range of at least 5 μm and not more than 30 μm and more preferably has a thickness in the range of at least 10 μm and not more than 20 μm.

The release layer 113 is preferably adhered to the elastic layer 112 through a primer. In such a case the thickness of the primer is preferably in the range of at least 2 μm and not more than 5 μm.

The Image Fixing Apparatus of a Color Image-Forming Apparatus

Figure 4:
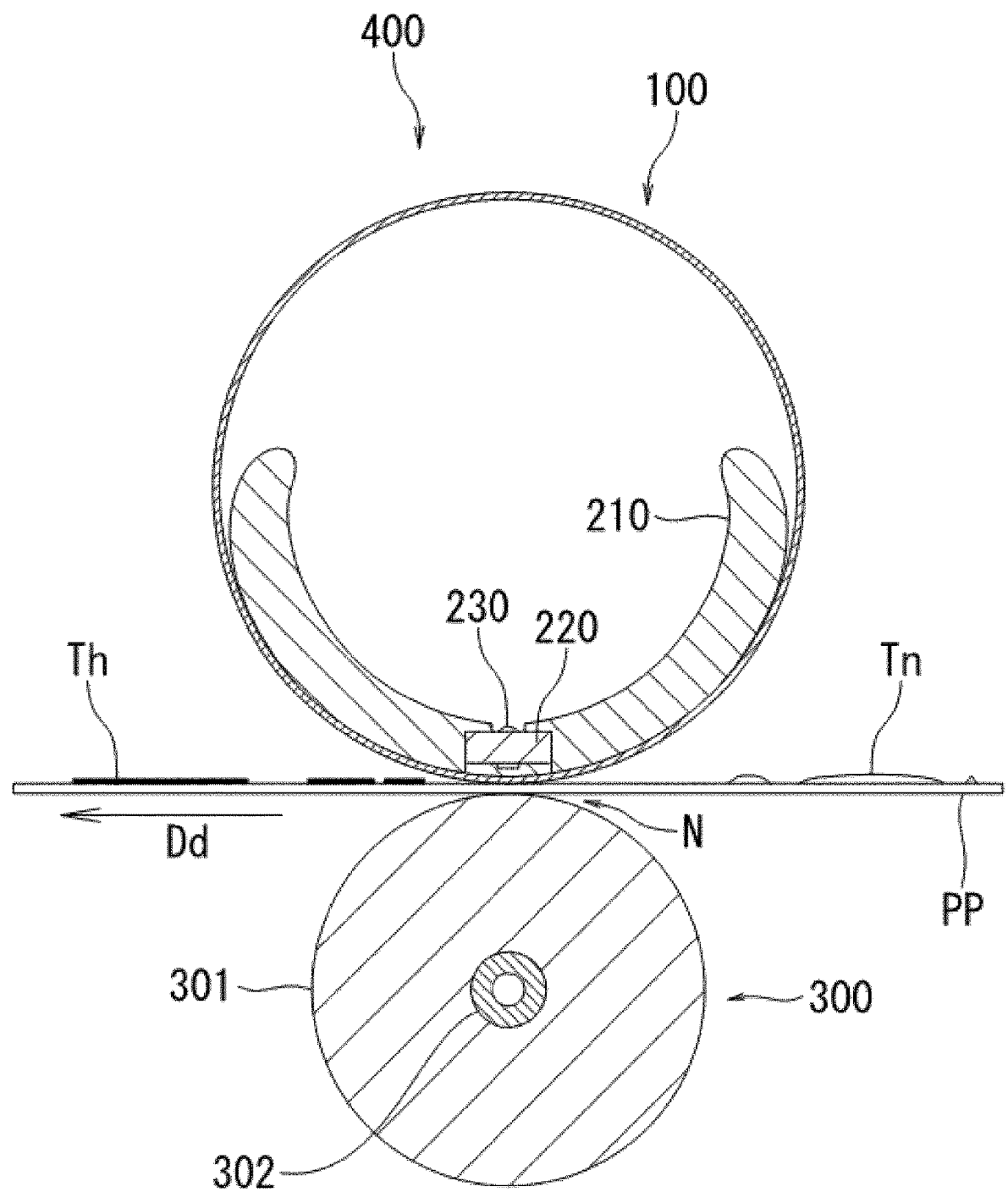
FIG. 4

An embodiment of an image fixing apparatus that incorporates the seamless fixing tubular article 100 according to this application example is described here. As shown in FIG. 4, the image fixing apparatus 400 is constituted mainly of the aforementioned seamless fixing tubular article 100, a belt guide 210, a ceramic heater 220, a thermistor 230, and a pressure roll 300.

The seamless fixing tubular article 100 here is as described in the preceding. The belt guide 210 is formed from a heat-resistant insulating resin, e.g., polyphenylene sulfide, polyamideimide, polyetheretherketone, liquid crystalline polymer, and so forth. The ceramic heater 220 performs resistance heating through the passage of current therethrough and heats the seamless fixing tubular article 100. The heating temperature of the ceramic heater 220 is controlled based on the measured value from the thermistor 230. The pressure roll 300 is constituted of a roll main body 301 and a shaft 302. The shaft 302 extends to both sides along the rotational axis of the roll main body 301 and is connected to a drive motor (not shown). As shown in FIG. 4, the roll main body 301 is in pressure contact with the seamless fixing tubular article 100 and as a result a nip region N is formed between the roll main body 301 and the seamless fixing tubular article 100. Thus, when driven by the drive motor, the roll main body 301 rotates centered on the rotational axis and drives the seamless fixing tubular article 100 that is in pressure contact with the pressure roll 300. As shown in FIG. 4, copy paper PP, on which an unfixed toner image Tn has been formed, is progressively fed into this nip region N and the unfixed toner image Tn is progressively thermally fixed to the copy paper PP (the toner image after fixing is indicated by the Th label).

(2) Second Application Example

The elastomer thermal conductivity modifier according to an embodiment of the present invention can be used as a starting material for forming the elastic layer in a seamless resistance-heating fixing belt or a seamless resistance-heating fixing tube (collectively referred to in the following as a "seamless resistance-heating fixing tubular article") used in the image fixing apparatus of a color image-forming apparatus, e.g., a color copier or a color laser printer. The details of this seamless resistance-heating fixing tubular article are given below. This seamless resistance-heating fixing tubular article is a heater body that itself generates heat through the passage of electrical current therethrough.

Structure of the Seamless Resistance-Heating Fixing Tubular Article

Figure 5:
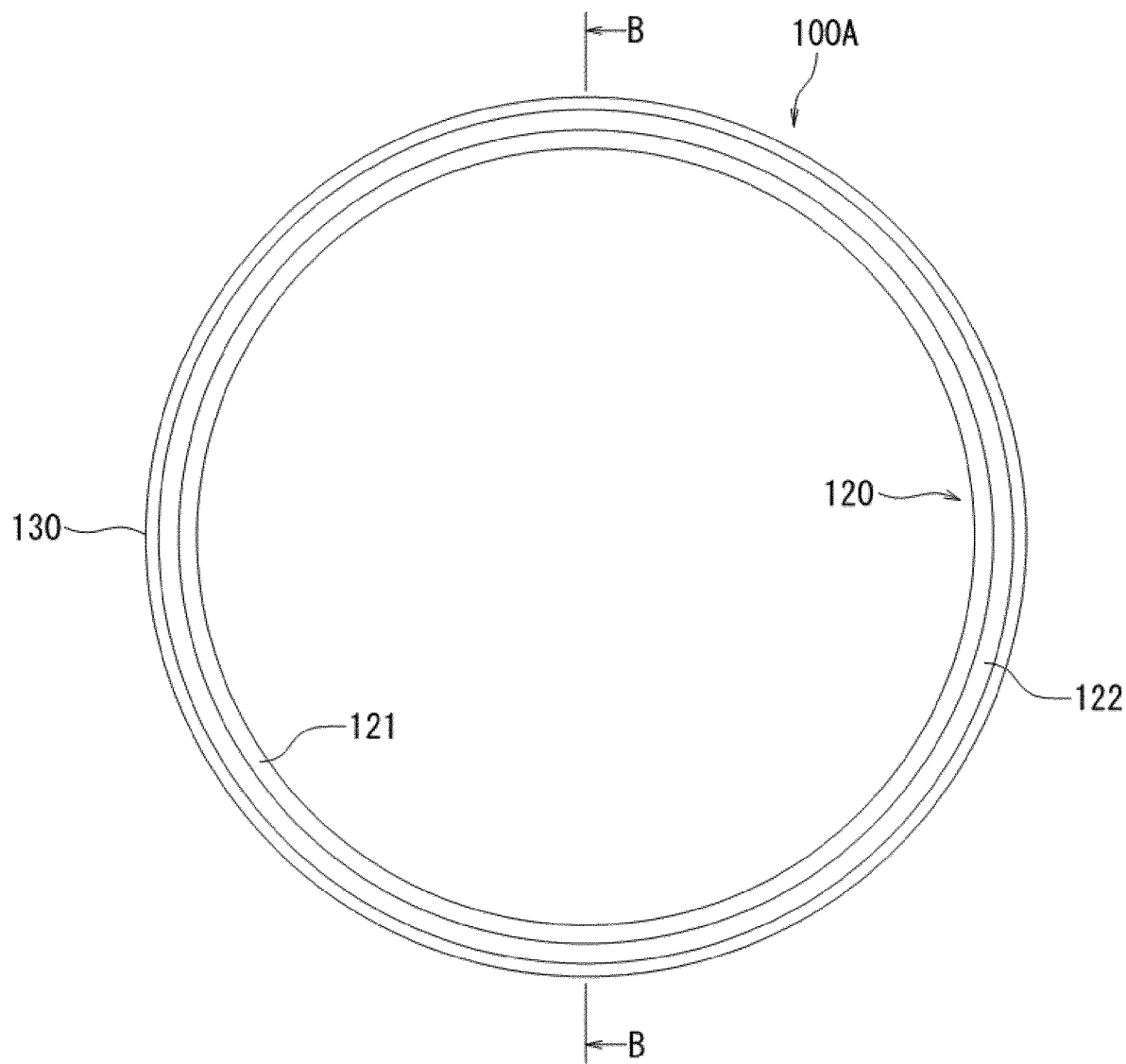
FIG. 5

The seamless resistance-heating fixing tubular article 100A according to this application example is a flexible tubular body just as for the seamless fixing tubular article 100 according to the first application example, and, as shown in FIG. 5, is mainly constituted of a main body 120 and a pair of electrodes 130. The details of these constituent elements 120 and 130 are described below. Methods for producing this seamless resistance-heating fixing tubular article 100A are already known, and as a consequence a description thereof is omitted.

(1) Main Body

Figure 6:
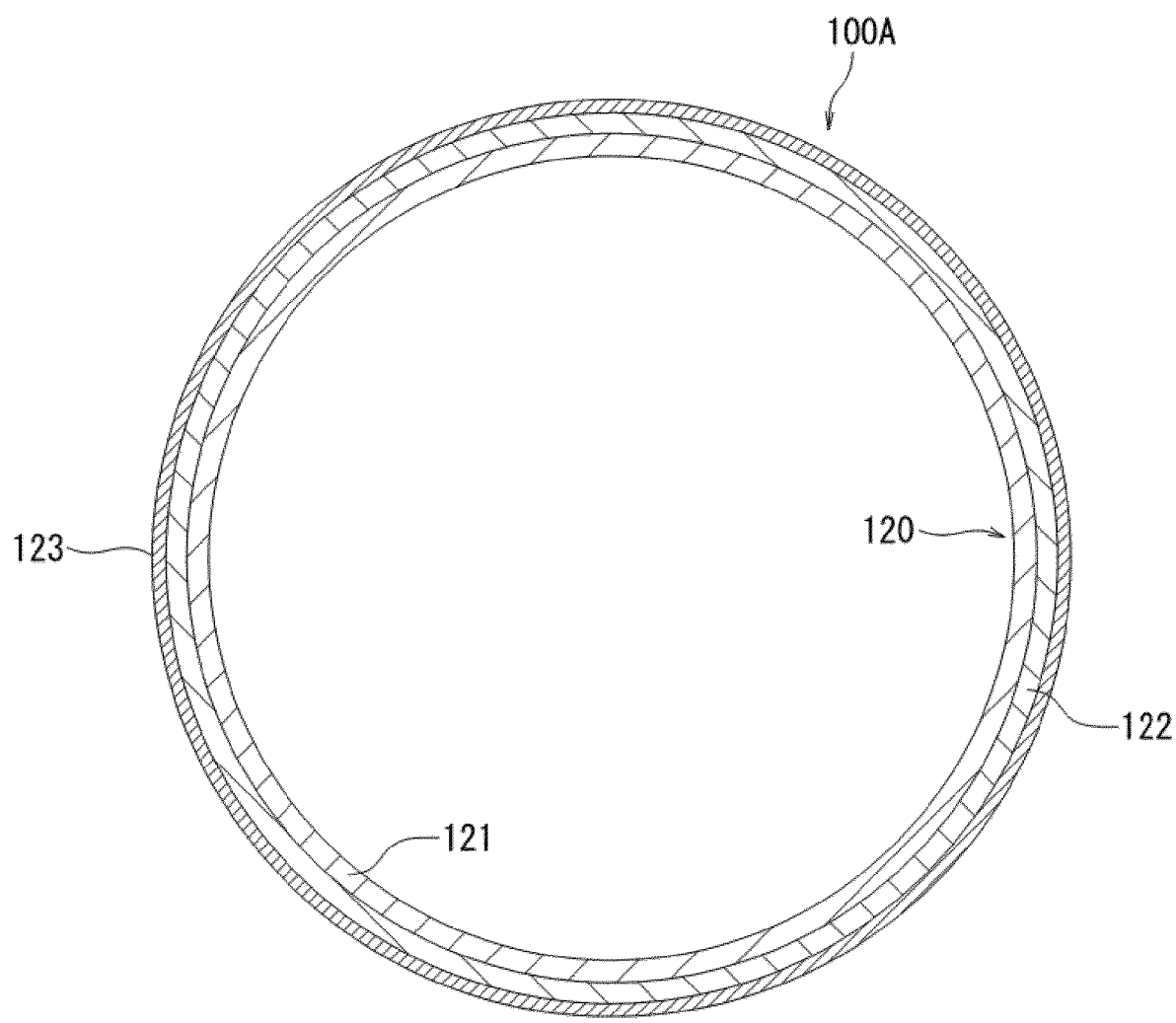
FIG. 6
Figure 7:
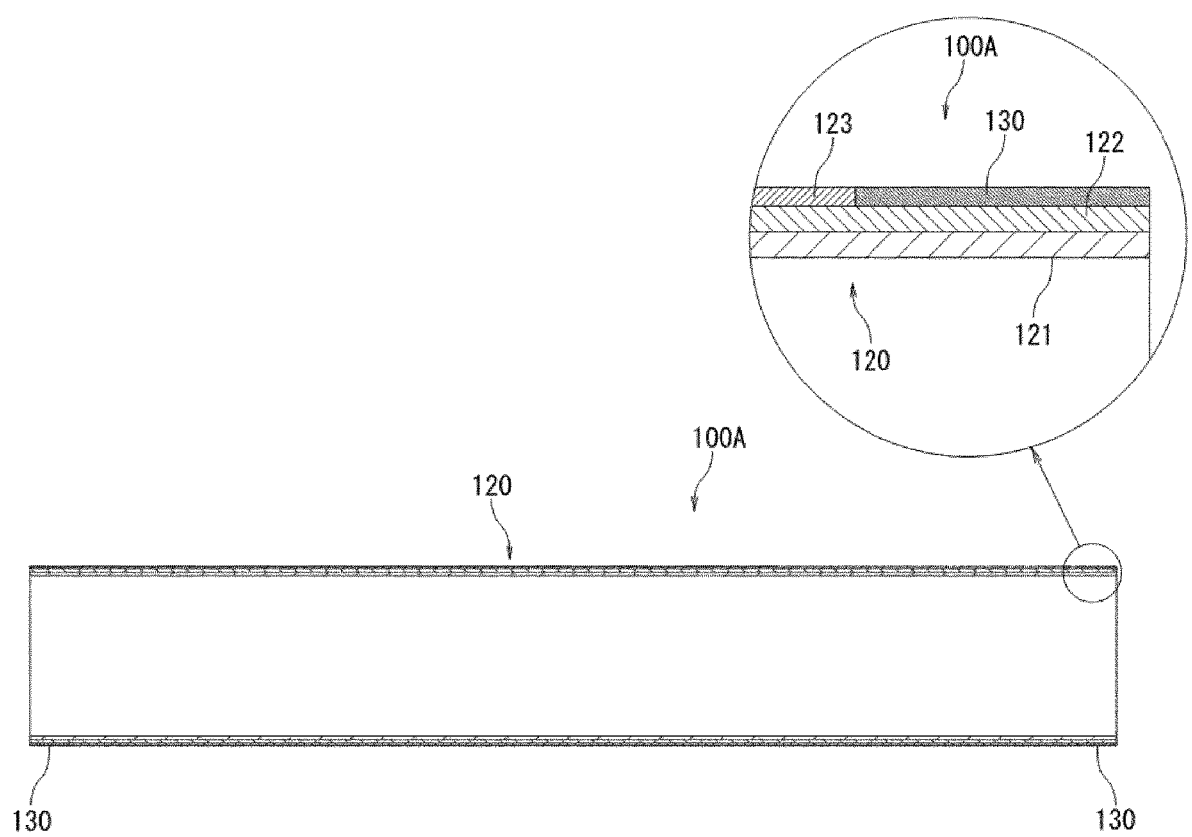
FIG. 7

As shown in FIGS. 6 and 7, the main body 120 is constituted mainly of a heat-generating resin layer 121, an elastic layer 122, and a release layer 123. These layers 121, 122, and 123 are described in detail in the following.

(1-1) Heat-Generating Resin Layer

As shown in FIGS. 5 to 7, the heat-generating resin layer 121 is a seamless tubular layer and is preferably formed mainly from a heat-resistant insulating material that can withstand the temperatures at which the seamless resistance-heating fixing tubular article 100A is used. This heat-resistant insulating material can be exemplified by heat-resistant resins. The heat-resistant resin in the seamless resistance-heating fixing tubular article 100A in this embodiment is preferably a resin having a polyimide resin as its major component, wherein the use of polyimide resin as such is more preferred. When the heat-resistant resin is a resin having a polyimide resin as its major component, another heat-resistant resin, e.g., polyamideimide or polyethersulfone, may be added to the heat-resistant resin in a range in which the essential character of the present invention is not lost. An electroconductive filler material, e.g., a carbon nanomaterial or finely divided metal particles, is incorporated in this heat-resistant resin in this heat-generating resin layer 121. The volume percentage of the electroconductive filler material with respect to the heat-generating resin layer 121 can be adjusted depending on the desired resistance value.

In addition, with the goal of increasing, for example, the thermal conductivity, electrically insulating particles, e.g., of alumina, boron nitride, aluminum nitride, silicon carbide, titanium oxide, silica, potassium titanate, silicon nitride, and so forth, may be added to the heat-generating resin layer 121, while fibrous particles, e.g., potassium titanate fibers, acicular titanium oxide, aluminum borate whiskers, tetrapod-shaped zinc oxide whiskers, sepiolite, glass fiber, and so forth, and clay minerals, e.g., montmorillonite, talc, and so forth, may be added with the goal of enhancing, for example, the mechanical properties.

(1-2) Elastic Layer

As indicated above, the elastic layer 122 is formed from "elastomer containing the elastomer thermal conductivity modifier" or from the "elastomer thermal conductivity modifier itself". This elastic layer 122 preferably has a silicone rubber or a fluororubber as its major component. This elastic layer 122 is preferably soft and has a low hardness. In specific terms, the hardness, for example, as the JIS-A hardness, is preferably in the range of at least 3 degrees and not more than 50 degrees. The thickness of this elastic layer 122 is preferably in the range of at least 100 μm and not more than 500 μm.

(1-3) Release Layer

The release layer 123 is preferably formed from at least one from the group consisting of fluororesins, silicone rubbers, and fluororubbers. The fluororesins can be exemplified by polytetrafluoroethylene (PTFE), tetrafluoroethylene-perfluoroalkyl vinyl ether copolymer (PFA), and tetrafluoroethylene-hexafluoropropylene copolymer (FEP), and a single one of these may be used by itself or a mixture of these may be used. In this case, the release layer 123 preferably has a thickness in the range of at least 5 μm and not more than 30 μm and more preferably has a thickness in the range of at least 10 μm and not more than 20 μm.

The release layer 123 is preferably adhered to the heat-generating resin layer 121 through a primer. In this case the thickness of the primer is preferably in the range of at least 2 μm and not more than 5 μm.

(2) Electrode

Figure 8:
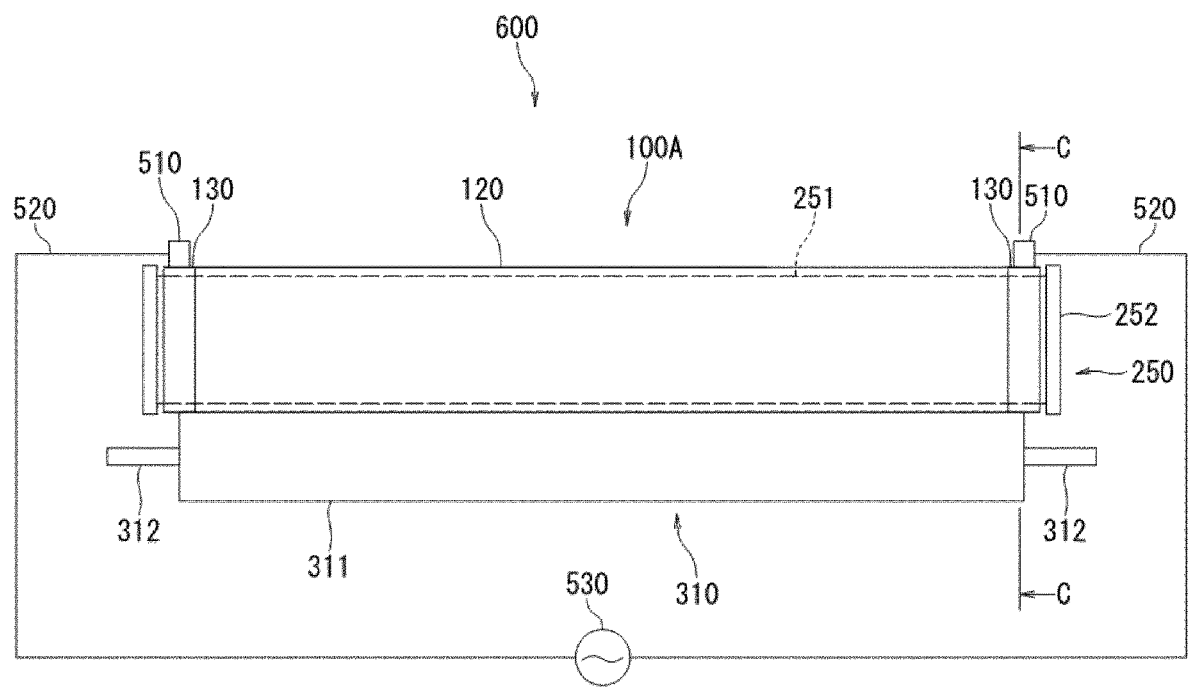
FIG. 8

As shown in FIGS. 5 and 7, the electrodes 130 are disposed so as to be exposed on the outer surface at the two end regions of the main body 120. This electrode 130, for example, can be formed from a silver paste. For example, the silver paste disclosed in WO 08/016148 can be used as this silver paste. When the seamless resistance-heating fixing tubular article 100A is used, a power feed member 510 contacts the electrode 130 as shown in FIG. 8. As a consequence, power is fed to the heat-generating resin layer 121, which is disposed in contact with the electrodes 130, and the heat-generating resin layer 121 then engages in resistance heating. The power feed member 510 is exemplified by a power feed brush, power feed roll, power feed bar, and so forth.

The Image Fixing Apparatus of a Color Image-Forming Apparatus

Figure 9:
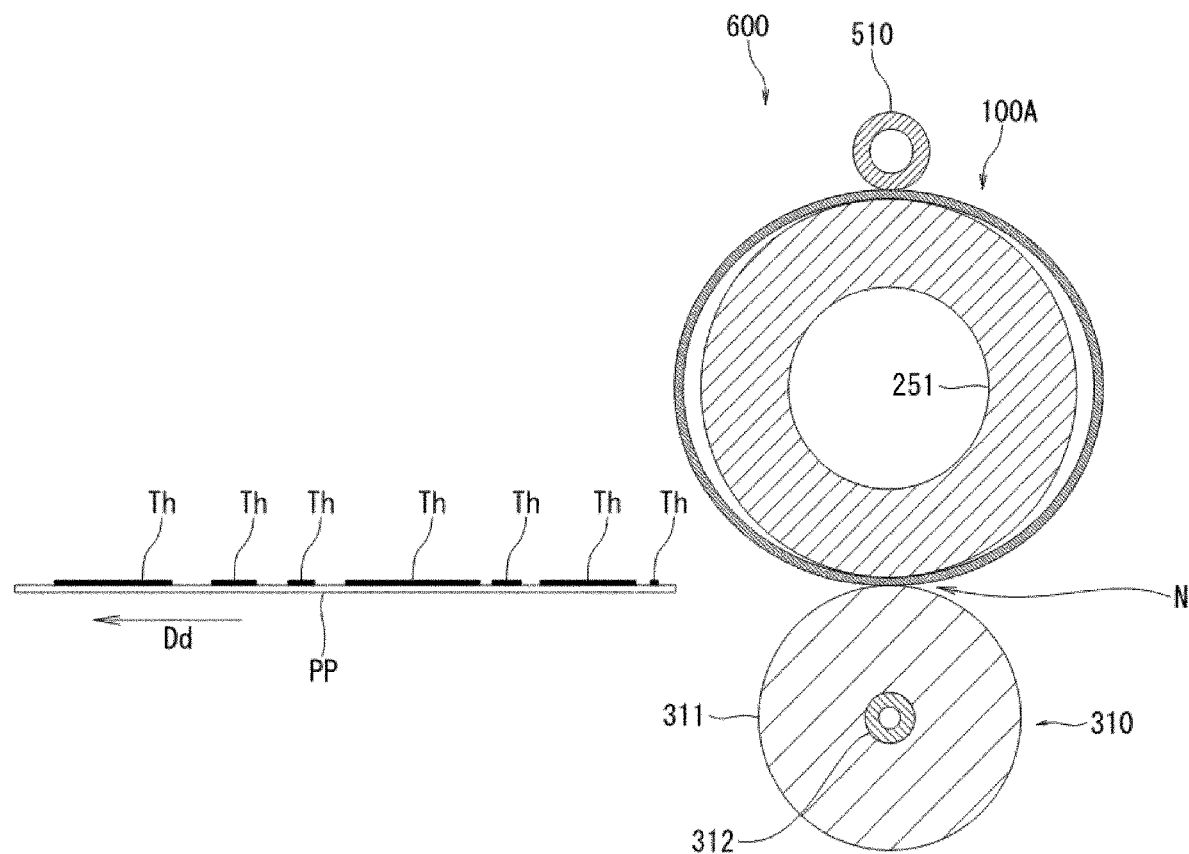
FIG. 9

An embodiment of an image fixing apparatus that incorporates the seamless resistance-heating fixing tubular article 100A according to this application example is described here. As shown in FIGS. 8 and 9, this image fixing apparatus 600 is constituted mainly of the aforementioned seamless resistance-heating fixing tubular article 100A, a belt support 250, a pressure roll 310, and a power feed roll 510.

The seamless resistance-heating fixing tubular article 100A here is as described in the preceding. The belt support 250 is formed from a heat-resistant insulating resin, e.g., polyphenylene sulfide, polyamideimide, polyetheretherketone, liquid crystalline polymer, and so forth, and is constituted mainly of a cylindrical part 251 and a belt guide part 252. As shown in FIG. 8, the cylindrical part 251 is rotatably disposed within the seamless resistance-heating fixing tubular article 100A. The belt guide part 252 functions as stopper when the seamless resistance-heating fixing tubular article 100A meanders in the width direction. The pressure roll 310 is constituted of a roll main body 311 and a shaft 312. The shaft 312 extends to both sides along the rotational axis of the roll main body 311 and is connected to a drive motor (not shown). As shown in FIGS. 8 and 9, the roll main body 311 is in pressure contact with the seamless resistance-heating fixing tubular article 100A and as a result a nip region N is formed between the roll main body 311 and the seamless resistance-heating fixing tubular article 100A. Thus, when driven by the drive motor, the roll main body 311 rotates centered on the rotational axis and drives the seamless resistance-heating fixing tubular article 100A that is in pressure contact with the pressure roll 310. As shown in FIG. 9, copy paper PP, on which an unfixed toner image has been formed, is progressively fed into this nip region N and the unfixed toner image is progressively thermally fixed to the copy paper PP (the toner image after fixing is indicated by the Th label). The power feed roll 510 is connected through a lead wire 520 to an alternating current power source 530 and is in contact with the electrode 130 of the seamless resistance-heating fixing tubular article 100A. As a consequence, electricity is supplied from the alternating current power source 530 through the power feed roll 510 to the seamless resistance-heating fixing tubular article 100A. As indicated above, the heat-generating resin layer 121 performs resistance heating when electricity is passed through the seamless resistance-heating fixing tubular article 100A.

(3) Third Application Example

The elastomer thermal conductivity modifier according to an embodiment of the present invention can be used as a starting material for forming the elastic layer in a seamless induction-heating fixing belt or a seamless induction-heating fixing tube (collectively referred to in the following as a "seamless induction-heating fixing tubular article") used in the image fixing apparatus of a color image-forming apparatus, e.g., a color copier or a color laser printer. The details of this seamless induction-heating fixing tubular article are given below. This seamless induction-heating fixing tubular article is a heater body that itself generates heat through electromagnetic induction.

Structure of the Seamless Induction-Heating Fixing Tubular Article

Figure 10:
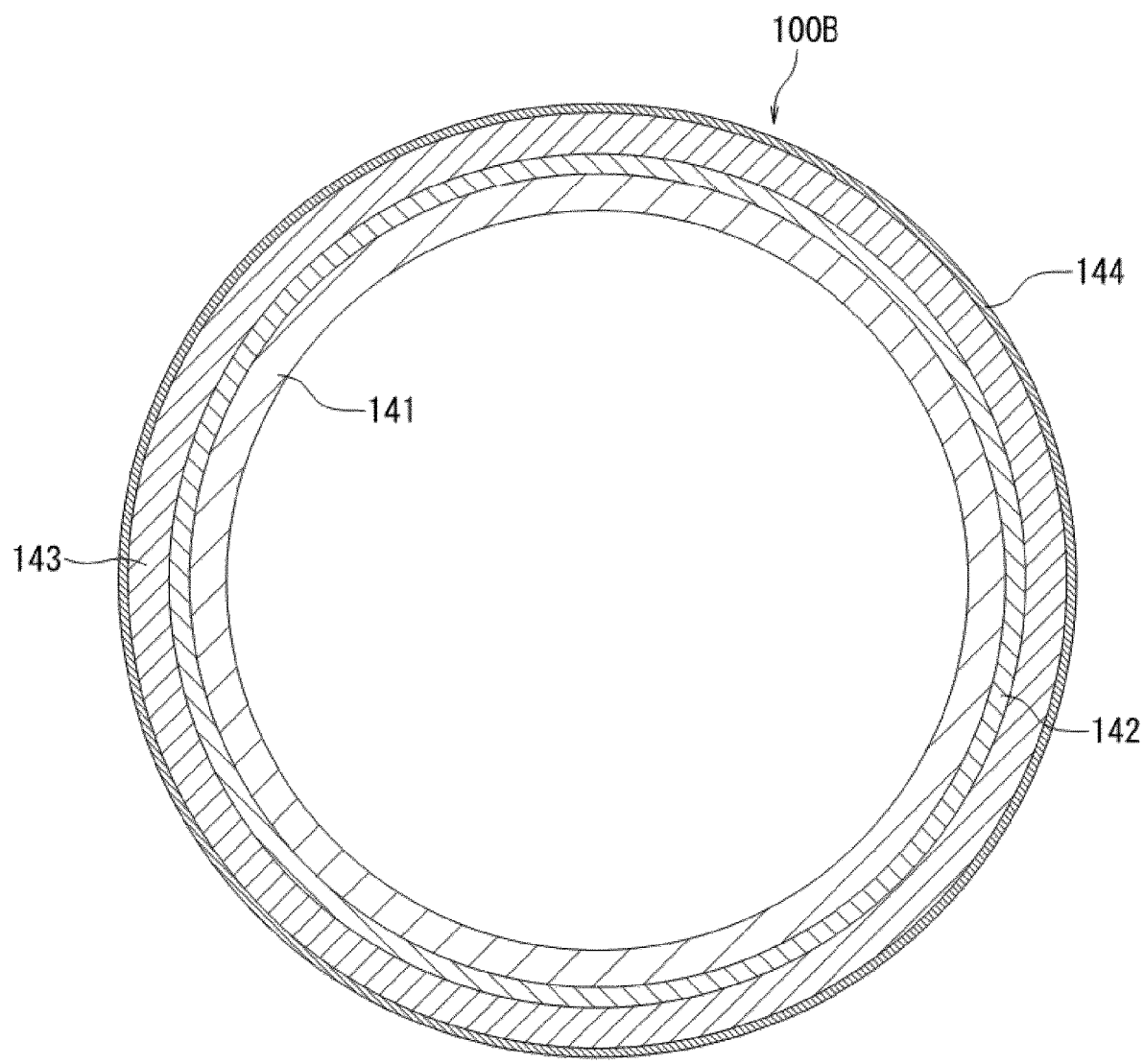
FIG. 10

As shown in FIG. 10, the seamless induction-heating fixing tubular article 100B according to this application example is constituted mainly of a base layer 141, a nonmagnetic conductive metal layer 142, an elastic layer 143, and a release layer 144. These layers 141, 142, 143, and 144 are described in detail below.

(1) Base Layer

The base layer 141 is formed mainly from a resin. The "resin" referenced here is preferably a heat-resistant resin that can withstand the temperatures at which the seamless induction-heating fixing tubular article 100B is used. In this embodiment, this heat-resistant resin is preferably a resin having a polyimide resin as its major component and is more preferably a polyimide resin as such. When the heat-resistant resin is a resin having a polyimide resin as its major component, another heat-resistant resin, e.g., polyamideimide or polyethersulfone, may be added to the heat-resistant resin.

(2) Nonmagnetic Conductive Metal Layer

The nonmagnetic conductive metal layer 142 is formed mainly of a nonmagnetic conductive metal, e.g., silver, aluminum, iron, copper, stainless steel, and so forth, and is disposed in contact with the base layer 141 on the outer peripheral side of the base layer 141.

(3) Elastic Layer

As indicated above, the elastic layer 143 is formed from "elastomer containing the elastomer thermal conductivity modifier" or from the "elastomer thermal conductivity modifier itself". This elastic layer 143 preferably has a silicone rubber or a fluororubber as its major component. This elastic layer 143 is preferably soft and has a low hardness. In specific terms, the hardness, for example, as the JIS-A hardness, is preferably in the range of at least 3 degrees and not more than 50 degrees. The thickness of this elastic layer 143 is preferably in the range of at least 100 μm and not more than 500 μm.

(4) Release Layer

The release layer 144 is formed from at least one selection from the group consisting of fluororesins, silicone rubbers, and fluororubbers, and is disposed so as to contact the outer surface of the elastic layer 143. The fluororesins can be exemplified by polytetrafluoroethylene (PTFE), tetrafluoroethylene-perfluoroalkyl vinyl ether copolymer (PFA), and tetrafluoroethylene-hexafluoropropylene copolymer (FEP), and a single one of these may be used by itself or a mixture of these may be used. In this case, the release layer 144 preferably has a thickness in the range of at least 5 μm and not more than 30 μm and more preferably has a thickness in the range of at least 10 μm and not more than 20 μm.

The release layer 144 is preferably adhered to the elastic layer 143 through a primer. In this case the thickness of the primer is preferably in the range of at least 2 μm and not more than 5 μm.

Image Fixing Apparatus in a Color Image-Forming Apparatus

Figure 11:
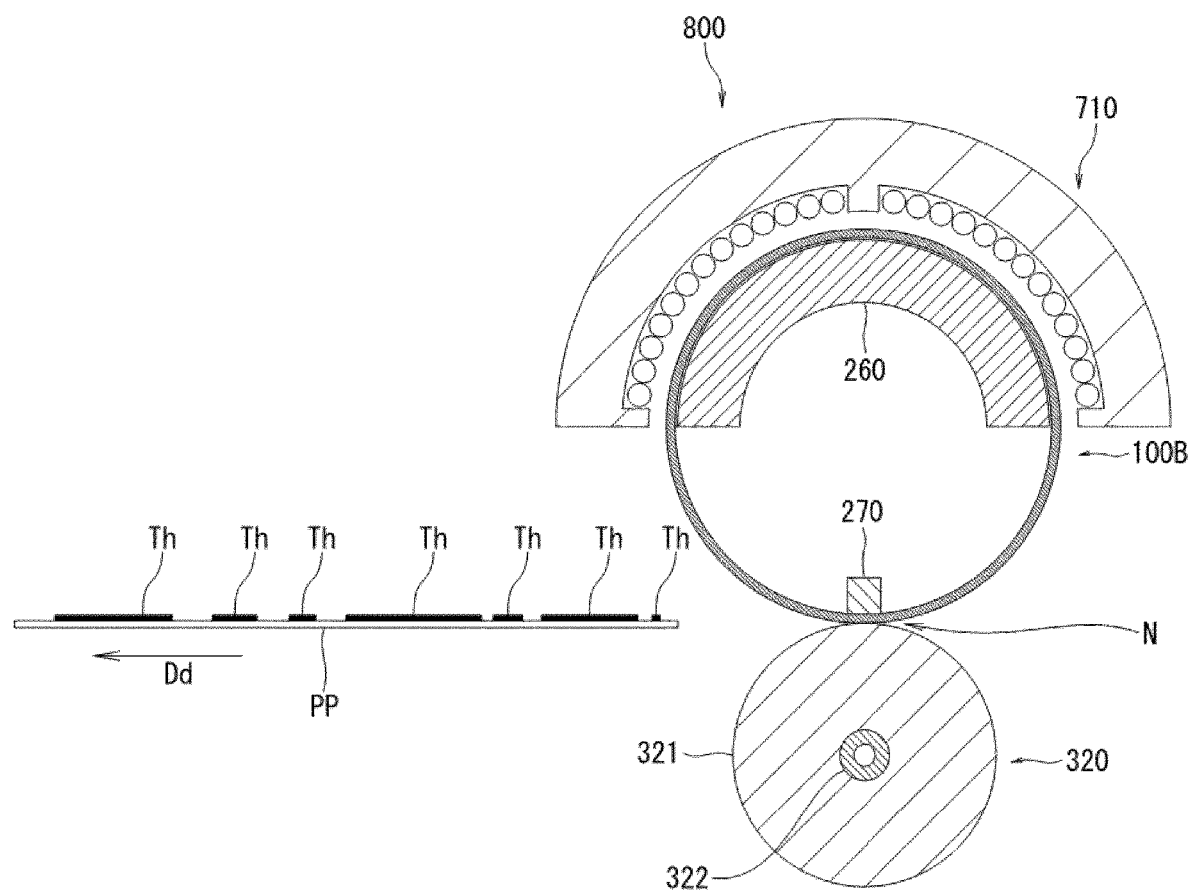
FIG. 11

An embodiment is described here of an image fixing apparatus that incorporates the seamless induction-heating fixing tubular article 100B according to this application example. As shown in FIG. 11, this image fixing apparatus 800 is constituted mainly of the aforementioned seamless induction-heating fixing tubular article 100B, an upper belt support 260, a lower belt support 270, a pressure roll 320, and an induction heating coil 710.

The seamless induction-heating fixing tubular article 100B is as described above. The upper belt support 260 is formed from a heat-resistant insulating resin, e.g., polyphenylene sulfide, polyamideimide, polyetheretherketone, liquid crystalline polymer, and so forth, and supports the upper side of the seamless induction-heating fixing tubular article 100B as shown in FIG. 11. The lower belt support 270 supports the lower side of the seamless induction-heating fixing tubular article 100B as shown in FIG. 11. The pressure roll 320 is constituted of a roll main body 321 and a shaft 322. The shaft 322 extends to both sides along the rotational axis of the roll main body 321 and is connected to a drive motor (not shown). As shown in FIG. 11, the roll main body 321 is in pressure contact with the seamless induction-heating fixing tubular article 100B and as a result a nip region N is formed between the roll main body 321 and the seamless induction-heating fixing tubular article 100B. Thus, when driven by the drive motor, the roll main body 321 rotates centered on the rotational axis and drives the seamless induction-heating fixing tubular article 100B that is in pressure contact with the pressure roll 320. As shown in FIG. 11, copy paper PP, on which an unfixed toner image has been formed, is progressively fed into this nip region N and the unfixed toner image is progressively thermally fixed to the copy paper PP (the toner image after fixing is indicated by the Th label). The induction heating coil 710 is disposed so as to cover the upper half of the seamless induction-heating fixing tubular article 100B as shown in FIG. 11 and produces magnetic flux when electricity is passed through it. The production of this magnetic flux causes the nonmagnetic conductive metal layer 142 of the seamless induction-heating fixing tubular article 100B to engage in inductive heat generation.

EXAMPLES

Examples are given below in order to describe the present invention in greater detail. However, the present invention is not limited to or by the examples given below.

Example 1

Synthesis of Liquid Crystalline Silicone Polymer 16.1 g (61.2 mmol) of 4-cyano-4'-pent-4-enoxy-1,1'-biphenyl with the following chemical formula (3) and 6.25 g of a polymethylhydrosiloxane with the following chemical formula (A) (degree of polymerization: 26 to 51, weight-average molecular weight (Mw): 1700 to 3200) were dissolved in 200 mL of toluene (this solution is referred to below as "solution A"). In addition, a catalytic amount of a Pt/C platinum catalyst was dispersed in 2-propanol (this dispersion is referred to below as "dispersion B"). Dispersion B was added to solution A and the temperature of the mixture was adjusted to 110° C. The mixture was then stirred for 24 hours while being held at 110° C. After the completion of stirring, the solvent was distillatively removed from the mixture using a rotary evaporator to obtain a crude compound. This crude compound was dissolved in acetone. Ethanol, which was a poor solvent for the crude compound, was then added to the acetone solution of the crude compound to reprecipitate the crude compound. This reprecipitation procedure was carried out three times, followed by recovery of the precipitate to obtain a liquid crystalline silicone polymer. The introduction ratio of the mesogenic group with reference to the polymethylhydrosiloxane was approximately 43%.

[C7]

(3)

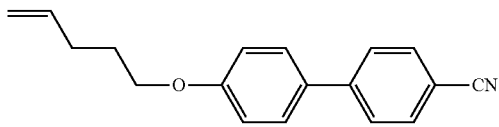

[C8]

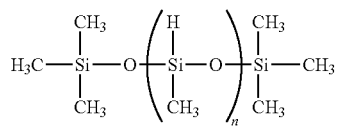

(A)

Synthesis of Liquid Crystalline Silicone Elastomer 0.1 g of the crosslinking agent with the following chemical formula (B), 300 μL of the reaction inhibitor with the following chemical formula (C), and 0.1 μL of the Pt(dvs) platinum catalyst with the following chemical formula (D) were added to 1.0 g of the liquid crystalline silicone polymer obtained as described above and these were then thoroughly mixed. This mixture was heated for 0.5 hours (30 minutes) at 150° C. and also for 0.5 hours (30 minutes) at 200° C. to obtain a liquid crystalline silicone elastomer.

[C9]

(B)

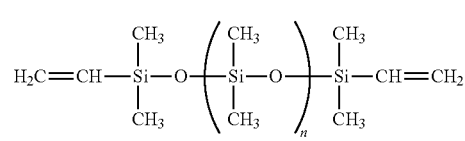

[C10]

(C)

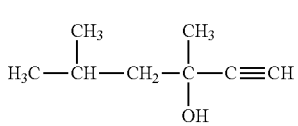

[C11]

(D)

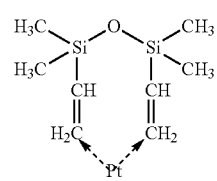

Properties of the Liquid Crystalline Silicone Elastomer (1) Confirmation of Liquid Crystalline Structure The liquid crystalline silicone elastomer was found to exhibit a smectic phase when the liquid crystalline structure of the obtained liquid crystalline silicone elastomer was confirmed using a polarization microscope.

(2) Measurement of the Thermal Conductivity

Measurement of the thermal conductivity of this liquid crystalline silicone elastomer by the heat flow measurement method (HFM method) according to ASTM C 518 and JIS-A 1412-2 gave a thermal conductivity of 0.737 W/m·K.

(3) Measurement of the Hardness

Measurement of the type A durometer hardness of the liquid crystalline silicone elastomer according to the hardness measurement method described in JIS K 6253 gave a hardness of 30.

Preparation of a Seamless Fixing Tubular Article

A polyamic acid solution (composition: 3,3',4,4'-biphenyltetracarboxylic dianhydride (abbreviated as "BPDA" below)/para-phenylenediamine (abbreviated as "PPD" below), solids fraction: 17.0 mass %) was uniformly coated on the surface of a cylindrical die whose surface had been subjected to a release treatment, and the coating was then sequentially heated under conditions of 100° C. for 10 minutes, 150° C. for 20 minutes, 250° C. for 30 minutes, and 400° C. for 15 minutes to obtain a polyimide tubular article A having a thickness of 60 μm.

The surface of the polyimide tubular article A was then coated with a primer liquid and the coating was heated for 10 minutes at 150° C. The aforementioned liquid crystalline silicone elastomer was uniformly coated on the region on which the primer liquid had been coated, followed by sequentially heating under conditions of 150° C. for 30 minutes and 200° C. for 30 minutes to carry out vulcanization of the liquid crystalline silicone rubber and form an elastic layer having a thickness of 300 μm.

A primer liquid was then coated on the outer surface of the elastic layer and this coating was heated for 10 minutes at 150° C. A fluororesin dispersion was uniformly coated on the primer-coated region and this coating was then dried for 10 minutes at 60° C. and baked for an additional 10 minutes at 340° C. to form a release layer having a thickness of 20 μm. A seamless fixing tubular article having a thickness of 382 μm, an inner diameter of 18.00 mm and a length of 390 mm was obtained as a result.

When this seamless fixing tubular article was mounted in the fixing apparatus of a color laser printer and color printing was carried out, the toner fixing state was also excellent and a high-quality image was obtained.

Example 2

A liquid crystalline silicone elastomer was obtained proceeding as in Example 1, but changing the heating time at 200° C. in the (Synthesis of Liquid Crystalline Silicone Elastomer) to 0.75 hours (45 minutes), and the properties of this liquid crystalline silicone elastomer were evaluated as in Example 1.

This liquid crystalline silicone elastomer exhibited a smectic phase. The thermal conductivity of this liquid crystalline silicone elastomer was 0.475 W/m·K. The hardness of this liquid crystalline silicone elastomer was 45.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 3

A liquid crystalline silicone elastomer was obtained proceeding as in Example 1, but changing the heating time at 200° C. in the (Synthesis of Liquid Crystalline Silicone Elastomer) to 1 hour, and the properties of this liquid crystalline silicone elastomer were evaluated as in Example 1.

This liquid crystalline silicone elastomer exhibited a smectic phase. The thermal conductivity of this liquid crystalline silicone elastomer was 0.290 W/m·K. The hardness of this liquid crystalline silicone elastomer was 47.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 4

A liquid crystalline silicone elastomer was obtained proceeding as in Example 1, but changing the heating time at 200° C. in the (Synthesis of Liquid Crystalline Silicone Elastomer) to 3 hours, and the properties of this liquid crystalline silicone elastomer were evaluated as in Example 1.

This liquid crystalline silicone elastomer exhibited a smectic phase. The thermal conductivity of this liquid crystalline silicone elastomer was 0.284 W/m·K. The hardness of this liquid crystalline silicone elastomer was 64.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 5

A liquid crystalline silicone elastomer was obtained proceeding as in Example 1, but changing the heating time at 200° C. in the (Synthesis of Liquid Crystalline Silicone Elastomer) to 5 hours, and the properties of this liquid crystalline silicone elastomer were evaluated as in Example 1.

This liquid crystalline silicone elastomer exhibited a smectic phase. The thermal conductivity of this liquid crystalline silicone elastomer was 0.212 W/m·K. The hardness of this liquid crystalline silicone elastomer was 71.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 6

A liquid crystalline silicone elastomer was obtained proceeding as in Example 1, but in the (Synthesis of Liquid Crystalline Silicone Elastomer) changing the heating time at 200° C. to 1 hour and changing the amount of addition of the reaction inhibitor to 400 μL, and the properties of this liquid crystalline silicone elastomer were evaluated as in Example 1.

This liquid crystalline silicone elastomer exhibited a smectic phase. The thermal conductivity of this liquid crystalline silicone elastomer was 0.275 W/m·K. The hardness of this liquid crystalline silicone elastomer was 58.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 7

A liquid crystalline silicone elastomer was obtained proceeding as in Example 1, but in the (Synthesis of Liquid Crystalline Silicone Elastomer) changing the heating time at 200° C. to 1 hour and changing the amount of addition of the reaction inhibitor to 200 µL, and the properties of this liquid crystalline silicone elastomer were evaluated as in Example 1.

This liquid crystalline silicone elastomer exhibited a smectic phase. The thermal conductivity of this liquid crystalline silicone elastomer was 0.345 W/m·K. The hardness of this liquid crystalline silicone elastomer was 48.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 8

A liquid crystalline silicone elastomer was obtained proceeding as in Example 1, but in the (Synthesis of Liquid Crystalline Silicone Elastomer) changing the heating time at 200° C. to 1 hour and changing the amount of addition of the Pt(dvs) platinum catalyst to 0.5 µL, and the properties of this liquid crystalline silicone elastomer were evaluated as in Example 1.

This liquid crystalline silicone elastomer exhibited a smectic phase. The thermal conductivity of this liquid crystalline silicone elastomer was 0.234 W/m·K. The hardness of this liquid crystalline silicone elastomer was 82.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 9

A liquid crystalline silicone elastomer was obtained proceeding as in Example 1, but in the (Synthesis of Liquid Crystalline Silicone Elastomer) changing the heating time at 200° C. to 1 hour and changing the amount of addition of the Pt(dvs) platinum catalyst to 0.01 µL, and the properties of this liquid crystalline silicone elastomer were evaluated as in Example 1.

This liquid crystalline silicone elastomer exhibited a smectic phase. The thermal conductivity of this liquid crystalline silicone elastomer was 0.854 W/m·K. The hardness of this liquid crystalline silicone elastomer was 15.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 10

A liquid crystalline silicone elastomer was obtained proceeding as in Example 1, but in the (Synthesis of Liquid Crystalline Silicone Polymer) obtaining the liquid crystalline silicone polymer (mesogenic group introduction ratio of approximately 50%) by changing the amount of addition of the 4-cyano-4'-pent-4-enoxy-1,1'-biphenyl to 12.9 g (49.0 mmol) and changing the amount of addition of the polymethylhydrosiloxane to 5 g and in the (Synthesis of Liquid Crystalline Silicone Elastomer) changing the heating time at 200° C. to 1 hour, and the properties of this liquid crystalline silicone elastomer were evaluated as in Example 1.

This liquid crystalline silicone elastomer exhibited a smectic phase. The thermal conductivity of this liquid crystalline silicone elastomer was 0.351 W/m·K. The hardness of this liquid crystalline silicone elastomer was 70.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 11

A liquid crystalline silicone elastomer was obtained proceeding as in Example 1, but in the (Synthesis of Liquid Crystalline Silicone Polymer) obtaining the liquid crystalline silicone polymer (mesogenic group introduction ratio of approximately 37%) by changing the amount of addition of the 4-cyano-4'-pent-4-enoxy-1,1'-biphenyl to 7.75 g (29.4 mmol) and changing the amount of addition of the polymethylhydrosiloxane to 5 g and in the (Synthesis of Liquid Crystalline Silicone Elastomer) changing the heating time at 200° C. to 1 hour, and the properties of this liquid crystalline silicone elastomer were evaluated as in Example 1.

This liquid crystalline silicone elastomer exhibited a smectic phase. The thermal conductivity of this liquid crystalline silicone elastomer was 0.289 W/m·K. The hardness of this liquid crystalline silicone elastomer was 60.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 12

A liquid crystalline silicone elastomer was obtained proceeding as in Example 1, but in the (Synthesis of Liquid Crystalline Silicone Polymer) obtaining the liquid crystalline silicone polymer (mesogenic group introduction ratio of approximately 50%) by changing the amount of addition of the 4-cyano-4'-pent-4-enoxy-1,1'-biphenyl to 12.9 g (49.0 mmol) and changing the amount of addition of the polymethylhydrosiloxane to 5 g and in the (Synthesis of Liquid Crystalline Silicone Elastomer) changing the amount of addition of the Pt(dvs) platinum catalyst to 0.01 g, additionally adding 0.086 g of 1-dodecene as a curing auxiliary, and changing the heating time at 200° C. to 3 hours. The properties of this liquid crystalline silicone elastomer were evaluated as in Example 1.

This liquid crystalline silicone elastomer exhibited a smectic phase. The thermal conductivity of this liquid crystalline silicone elastomer was 1.07 W/m·K.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 13

A liquid crystalline silicone elastomer was obtained proceeding as in Example 12, but changing the heating time at 200° C. to 5 hours, and the properties of this liquid crystalline silicone elastomer were evaluated as in Example 1.

This liquid crystalline silicone elastomer exhibited a smectic phase. The thermal conductivity of this liquid crystalline silicone elastomer was 0.505 W/m·K.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 14

A liquid crystalline silicone elastomer was obtained proceeding as in Example 1, but in the (Synthesis of Liquid Crystalline Silicone Polymer) obtaining the liquid crystalline silicone polymer (mesogenic group introduction ratio of approximately 50%) by changing the amount of addition of the 4-cyano-4'-pent-4-enoxy-1,1'-biphenyl to 12.9 g (49.0 mmol) and changing the amount of addition of the polymethylhydrosiloxane to 5 g and in the (Synthesis of Liquid Crystalline Silicone Elastomer) changing the reaction inhibitor with chemical formula (C) to methylbutynol with chemical formula (E) below, changing the amount of addition of the Pt(dvs) platinum catalyst to 0.01 g, and changing the heating time at 200° C. to 3 hours. The properties of this liquid crystalline silicone elastomer were evaluated as in Example 1.

[C12]

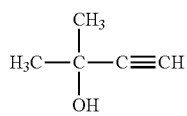

(E)

This liquid crystalline silicone elastomer exhibited a smectic phase. The thermal conductivity of this liquid crystalline silicone elastomer was 0.366 W/m·K.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 15

A liquid crystalline silicone elastomer was obtained proceeding as in Example 14, but changing the amount of addition of the methylbutynol to 30 μL, and the properties of this liquid crystalline silicone elastomer were evaluated as in Example 1.

This liquid crystalline silicone elastomer exhibited a smectic phase. The thermal conductivity of this liquid crystalline silicone elastomer was 0.455 W/m·K.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 16

A liquid crystalline silicone elastomer was obtained proceeding as in Example 12, but in the (Synthesis of Liquid Crystalline Silicone Elastomer) changing the reaction inhibitor with chemical formula (C) to methylbutynol with chemical formula (E), and the properties of this liquid crystalline silicone elastomer were evaluated as in Example 1.

This liquid crystalline silicone elastomer exhibited a smectic phase. The thermal conductivity of this liquid crystalline silicone elastomer was 0.449 W/m·K.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 17

A liquid crystalline silicone elastomer was obtained proceeding as in Example 1, but in the (Synthesis of Liquid Crystalline Silicone Polymer) obtaining the liquid crystalline silicone polymer (mesogenic group introduction ratio of approximately 30%) by changing the amount of addition of the 4-cyano-4'-pent-4-enoxy-1,1'-biphenyl to 7.7 g (29.3 mmol) and changing the amount of addition of the polymethylhydrosiloxane to 5.0 g and in the (Synthesis of Liquid Crystalline Silicone Elastomer) changing the heating time at 200° C. to 5 hours. The properties of this liquid crystalline silicone elastomer were evaluated as in Example 1.

This liquid crystalline silicone elastomer exhibited a smectic phase. The thermal conductivity of this liquid crystalline silicone elastomer was 0.443 W/m·K.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 18

A liquid crystalline silicone elastomer was obtained proceeding as in Example 1, but in the (Synthesis of Liquid Crystalline Silicone Polymer) obtaining the liquid crystalline silicone polymer (mesogenic group introduction ratio of approximately 40%) by changing the amount of addition of the 4-cyano-4'-pent-4-enoxy-1,1'-biphenyl to 10.2 g (38.8 mmol) and changing the amount of addition of the polymethylhydrosiloxane to 5.0 g and in the (Synthesis of Liquid Crystalline Silicone Elastomer) changing the heating time at 200° C. to 5 hours. The properties of this liquid crystalline silicone elastomer were evaluated as in Example 1.

This liquid crystalline silicone elastomer exhibited a smectic phase. The thermal conductivity of this liquid crystalline silicone elastomer was 0.447 W/m·K.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a Example 19

A liquid crystalline silicone elastomer was obtained proceeding as in Example 1, but in the (Synthesis of Liquid Crystalline Silicone Polymer) obtaining the liquid crystalline silicone polymer (mesogenic group introduction ratio of approximately 60%) by changing the amount of addition of the 4-cyano-4'-pent-4-enoxy-1,1'-biphenyl to 62.3 g (235 mmol) and changing the amount of addition of the polymethylhydrosiloxane to 24.1 g and in the (Synthesis of Liquid Crystalline Silicone Elastomer) changing the heating time at 200° C. to 5 hours. The properties of this liquid crystalline silicone elastomer were evaluated as in Example 1.

This liquid crystalline silicone elastomer exhibited a smectic phase. The thermal conductivity of this liquid crystalline silicone elastomer was 0.467 W/m·K.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 20

A liquid crystalline silicone elastomer was obtained proceeding as in Example 1, but in the (Synthesis of Liquid Crystalline Silicone Polymer) obtaining the liquid crystalline silicone polymer (mesogenic group introduction ratio of approximately 20%) by changing the 16.1 g (61.2 mmol) of 4-cyano-4'-pent-4-enoxy-1,1'-biphenyl to 0.689 g (2.25 mmol) of (4-cyanophenyl)-4-pent-4-enoxybenzoate with the following chemical formula (2) and changing the amount of addition of the polymethylhydrosiloxane to 0.5 g and in the (Synthesis of Liquid Crystalline Silicone Elastomer) changing the heating time at 200° C. to 1 hour. The properties of this liquid crystalline silicone elastomer were evaluated as in Example 1.

[C13]

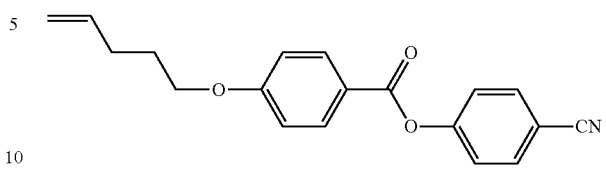

(2)

This liquid crystalline silicone elastomer exhibited a smectic phase. The thermal conductivity of this liquid crystalline silicone elastomer was 0.315 W/m·K.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 21

A liquid crystalline silicone elastomer was obtained proceeding as in Example 20, but in the (Synthesis of Liquid Crystalline Silicone Polymer) obtaining the liquid crystalline silicone polymer (mesogenic group introduction ratio of approximately 30%) by changing the amount of addition of the (4-cyanophenyl)-4-pent-4-enoxybenzoate to 1.04 g (3.39 mmol), and the properties of this liquid crystalline silicone elastomer were evaluated as in Example 1.

This liquid crystalline silicone elastomer exhibited a smectic phase. The thermal conductivity of this liquid crystalline silicone elastomer was 0.378 W/m·K.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 22

A liquid crystalline silicone elastomer was obtained proceeding as in Example 20, but in the (Synthesis of Liquid Crystalline Silicone Polymer) obtaining the liquid crystalline silicone polymer (mesogenic group introduction ratio of approximately 40%) by changing the amount of addition of the (4-cyanophenyl)-4-pent-4-enoxybenzoate to 1.38 g (4.50 mmol), and the properties of this liquid crystalline silicone elastomer were evaluated as in Example 1.

This liquid crystalline silicone elastomer exhibited a smectic phase. The thermal conductivity of this liquid crystalline silicone elastomer was 1.134 W/m·K.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 23

A liquid crystalline silicone elastomer was obtained proceeding as in Example 20, but in the (Synthesis of Liquid Crystalline Silicone Polymer) obtaining the liquid crystalline silicone polymer (mesogenic group introduction ratio of approximately 50%) by changing the amount of addition of the (4-cyanophenyl)-4-pent-4-enoxybenzoate to 1.73 g (5.64 mmol), and the properties of this liquid crystalline silicone elastomer were evaluated as in Example 1.

This liquid crystalline silicone elastomer exhibited a smectic phase. The thermal conductivity of this liquid crystalline silicone elastomer was 0.989 W/m·K.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 24

A liquid crystalline silicone elastomer was obtained proceeding as in Example 1, but in the (Synthesis of Liquid Crystalline Silicone Polymer) obtaining the liquid crystalline silicone polymer (mesogenic group introduction ratio of approximately 30%) by changing the 16.1 g (61.2 mmol) of 4-cyano-4'-pent-4-enoxy-1,1'-biphenyl to 12.1 g (38.7 mmol) of (4-methoxyphenyl)-4-pent-4-enoxybenzoate with the following chemical formula (1) and changing the amount of addition of the polymethylhydrosiloxane to 5.0 g and in the (Synthesis of Liquid Crystalline Silicone Elastomer) changing the heating time at 200° C. to 5 hours. The properties of this liquid crystalline silicone elastomer were evaluated as in Example 1.

[C14]

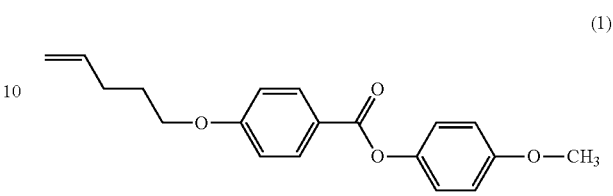

(1)

This liquid crystalline silicone elastomer exhibited a nematic phase (however, a smectic phase was exhibited in the state of the liquid crystalline silicone polymer). The thermal conductivity of this liquid crystalline silicone elastomer was 0.517 W/m·K.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

The results of the preceding examples are collected in Table 1 below.

TABLE 1

| | preparation of the liquid crystalline silicone polymer | | | | preparation of the liquid crystalline silicone elastomer | | | | | | | property evaluation | | |
|---|---|---|---|---|---|---|---|---|---|---|---|---|---|---|
| | mixing amounts | | | | mixing amounts | | | | | | heating | liquid | thermal | A |
| | MSGN | | | | | | | | RI | | time | crystal | conductivity | hard- |
| | PMHS (g) | compound | Amount (g) | Pt/C (g) | LCP (g) | CR (g) | CT (μL) | DDC (g) | compound | amount (μL) | t@200° C. | phase | (W/m · K) | ness |
| Example 1 | 6.25 | (3) | 16.1 | catalytic amount | 1.0 | 0.1 | 0.1 | 0 | DMHO | 300 | 0.5 | Sm | 0.737 | 30 |
| Example 2 | 6.25 | (3) | 16.1 | catalytic amount | 1.0 | 0.1 | 0.1 | 0 | DMHO | 300 | 0.75 | Sm | 0.475 | 45 |
| Example 3 | 6.25 | (3) | 16.1 | catalytic amount | 1.0 | 0.1 | 0.1 | 0 | DMHO | 300 | 1 | Sm | 0.290 | 47 |
| Example 4 | 6.25 | (3) | 16.1 | catalytic amount | 1.0 | 0.1 | 0.1 | 0 | DMHO | 300 | 3 | Sm | 0.284 | 64 |
| Example 5 | 6.25 | (3) | 16.1 | catalytic amount | 1.0 | 0.1 | 0.1 | 0 | DMHO | 300 | 5 | Sm | 0.212 | 71 |
| Example 6 | 6.25 | (3) | 16.1 | catalytic amount | 1.0 | 0.1 | 0.1 | 0 | DMHO | 400 | 1 | Sm | 0.275 | 58 |
| Example 7 | 6.25 | (3) | 16.1 | catalytic amount | 1.0 | 0.1 | 0.1 | 0 | DMHO | 200 | 1 | Sm | 0.345 | 48 |
| Example 8 | 6.25 | (3) | 16.1 | catalytic amount | 1.0 | 0.1 | 0.5 | 0 | DMHO | 300 | 1 | Sm | 0.234 | 82 |
| Example 9 | 6.25 | (3) | 16.1 | catalytic amount | 1.0 | 0.1 | 0.01 | 0 | DMHO | 300 | 1 | Sm | 0.854 | 15 |
| Example 10 | 5 | (3) | 12.9 | catalytic amount | 1.0 | 0.1 | 0.1 | 0 | DMHO | 300 | 1 | Sm | 0.351 | 70 |
| Example 11 | 5 | (3) | 7.75 | catalytic amount | 1.0 | 0.1 | 0.1 | 0 | DMHO | 300 | 1 | Sm | 0.289 | 60 |
| Example 12 | 5 | (3) | 12.9 | catalytic amount | 1.0 | 0.1 | 0.01 | 0.086 | DMHO | 300 | 3 | Sm | 1.07 | — |
| Example 13 | 5 | (3) | 12.9 | catalytic amount | 1.0 | 0.1 | 0.01 | 0.086 | DMHO | 300 | 5 | Sm | 0.505 | — |
| Example 14 | 5 | (3) | 12.9 | catalytic amount | 1.0 | 0.1 | 0.01 | 0 | MB | 300 | 3 | Sm | 0.366 | — |
| Example 15 | 5 | (3) | 12.9 | catalytic amount | 1.0 | 0.1 | 0.01 | 0 | MB | 30 | 3 | Sm | 0.455 | — |
| Example 16 | 5 | (3) | 12.9 | catalytic amount | 1.0 | 0.1 | 0.01 | 0.086 | MB | 300 | 3 | Sm | 0.449 | — |
| Example 17 | 5.0 | (3) | 7.7 | catalytic amount | 1.0 | 0.1 | 0.1 | 0 | DMHO | 300 | 5 | Sm | 0.443 | — |
| Example 18 | 5.0 | (3) | 10.2 | catalytic amount | 1.0 | 0.1 | 0.1 | 0 | DMHO | 300 | 5 | Sm | 0.447 | — |
| Example 19 | 24.1 | (3) | 62.3 | catalytic amount | 1.0 | 0.1 | 0.1 | 0 | DMHO | 300 | 5 | Sm | 0.467 | — |
| Example 20 | 0.5 | (2) | 0.689 | catalytic amount | 1.0 | 0.1 | 0.1 | 0 | DMHO | 300 | 1 | Sm | 0.315 | — |
| Example 21 | 0.5 | (2) | 1.04 | catalytic amount | 1.0 | 0.1 | 0.1 | 0 | DMHO | 300 | 1 | Sm | 0.378 | — |
| Example 22 | 0.5 | (2) | 1.38 | catalytic amount | 1.0 | 0.1 | 0.1 | 0 | DMHO | 300 | 1 | Sm | 1.134 | — |
| Example 23 | 0.5 | (2) | 1.73 | catalytic amount | 1.0 | 0.1 | 0.1 | 0 | DMHO | 300 | 1 | Sm | 0.989 | — |
| Example 24 | 5.0 | (1) | 12.1 | catalytic amount | 1.0 | 0.1 | 0.1 | 0 | DMHO | 300 | 5 | N | 0.517 | — |

In the table, "PMHS" indicates the polymethylhydrosiloxane with chemical formula (A) (degree of polymerization: 26 to 51, weight-average molecular weight (Mw): 1700 to 3200); "MSGN" indicates a vinyl group-containing mesogen compound; "Pt/C" indicates a platinum catalyst; "LCP" indicates the liquid-crystalline silicone polymer; "CR" indicates the crosslinking agent with chemical formula (B); "CT" indicates the platinum catalyst with chemical formula (D); "DDC" indicates 1-dodecene; "RI" indicates a reaction inhibitor; "DMHO" indicates the 3,5-dimethyl-1-hexyn-3-ol with chemical formula (C); "MB" indicates the methylbutynol with chemical formula (E); "t@200° C." indicates the heating time at 200° C.; "Sm" indicates smectic phase; and "N" indicates nematic phase.

Example 25

Synthesis of Liquid Crystalline Silicone Polymer 62.3 g (2.35 mmol) of the 4-cyano-4'-pent-4-enoxy-1,1'-biphenyl used in Example 1 and 24.1 g of the polymethylhydrosiloxane with chemical formula (A) used in Example 1 (degree of polymerization: 26 to 51, weight-average molecular weight (Mw): 1700 to 3200) were dissolved in 200 mL of toluene (this solution is referred to below as "solution A"). In addition, a catalytic amount of a Pt/C platinum catalyst was dispersed in 2-propanol (this dispersion is referred to below as "dispersion B"). Dispersion B was added to solution A and the temperature of the mixture was adjusted to 110° C. The mixture was then stirred for 24 hours while being held at 110° C. After the completion of stirring, the solvent was distillatively removed from the mixture using a rotary evaporator to obtain a crude compound. This crude compound was dissolved in acetone. Ethanol, which was a poor solvent for the crude compound, was then added to the acetone solution of the crude compound to reprecipitate the crude compound. This reprecipitation procedure was carried out three times, followed by recovery of the precipitate to obtain a liquid crystalline silicone polymer. The introduction ratio of the mesogenic group with reference to the polymethylhydrosiloxane was approximately 60%.

Synthesis of Filler-Containing Liquid Crystalline Silicone Elastomer 0.1 g of the crosslinking agent with chemical formula (B) used in Example 1, 300 µL of the reaction inhibitor with chemical formula (C) used in Example 1, and 0.1 µL of the Pt(dvs) platinum catalyst with chemical formula (D) used in Example 1 were added to 1.0 g of the liquid crystalline silicone polymer obtained as described above and these were then thoroughly mixed. This mixture was heated to 100° C. and to this was then added 0.208 g of silicon metal (M-Si #600, 7 µm, Kinsei Matec Co., Ltd.) with stirring and mixing. The mixture was then additionally kneaded by passage three times through a three-roll mill. The mixture was subsequently heated for 0.5 hours (30 minutes) at 150° C. and additionally for 5 hours at 200° C. to obtain a filler-containing liquid crystalline silicone elastomer. The silicon metal content in this filler-containing liquid crystalline silicone elastomer was 20 mass % (10 volume %).

Measurement of the Thermal Conductivity of the Filler-Containing Liquid Crystalline Silicone Elastomer Measurement of the thermal conductivity of this filler-containing liquid crystalline silicone elastomer as in Example 1 gave a thermal conductivity of 0.595 W/m·K.

Preparation of a Seamless Fixing Tubular Article

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 26

A filler-containing liquid crystalline silicone elastomer was prepared proceeding as in Example 24, but changing the amount of addition of the silicon metal to 0.356 g. The silicon metal content in this filler-containing liquid crystalline silicone elastomer was 30 mass % (15 volume %). Measurement of the thermal conductivity of this filler-containing liquid crystalline silicone elastomer as in Example 1 gave a thermal conductivity of 0.771 W/m·K.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 27

A filler-containing liquid crystalline silicone elastomer was prepared proceeding as in Example 24, but changing the amount of addition of the silicon metal to 0.830 g. The silicon metal content in this filler-containing liquid crystalline silicone elastomer was 50 mass % (30 volume %). Measurement of the thermal conductivity of this filler-containing liquid crystalline silicone elastomer as in Example 1 gave a thermal conductivity of 1.421 W/m·K.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

Example 28

A filler-containing liquid crystalline silicone elastomer was prepared proceeding as in Example 24, but changing the amount of addition of the silicon metal to 1.02 g. The silicon metal content in this filler-containing liquid crystalline silicone elastomer was 55 mass % (35 volume %). Measurement of the thermal conductivity of this filler-containing liquid crystalline silicone elastomer as in Example 1 gave a thermal conductivity of 2.16 W/m·K. The extent of the increase in this thermal conductivity was greater than in the previously described examples.

A seamless fixing tubular article was obtained proceeding as in Example 1, except that the liquid crystalline silicone elastomer obtained in this example was used. When this seamless fixing tubular article was mounted in the fixing apparatus of a color laser printer and color printing was carried out, the toner fixing state was also excellent and a high-quality image was obtained.

The results of the preceding examples are collected in the following Table 2.

TABLE 2

|  | filler content | | thermal conductivity |
|---|---|---|---|
|  | mass % | volume % | (W/m · K) |
| Example 19 | 0 | 0 | 0.467 |
| Example 25 | 20 | 10 | 0.595 |
| Example 26 | 30 | 15 | 0.771 |
| Example 27 | 50 | 30 | 1.421 |
| Example 28 | 55 | 35 | 2.16 |

Example 29

Synthesis of Liquid Crystalline Silicone Polymer

A liquid crystalline silicone polymer (mesogenic group introduction ratio of approximately 75%) was obtained proceeding as in Example 1, but changing the amount of addition of the 4-cyano-4'-pent-4-enoxy-1,1'-biphenyl to 32.6 g (124 mmol) and changing the amount of addition of the polymethylhydrosiloxane to 10.0 g.

Synthesis of Liquid Crystalline Silicone Elastomer 30 mass parts of the liquid crystalline silicone polymer obtained as described above and 40 mass parts of 5-methyl-2-hexane were added to 100 mass parts of a silicone rubber (raw rubber, KE-1950-10 (Shin-Etsu Chemical Co., Ltd.)), and this mixture was stirred while being heated at 100° C.

Proceeding as in Example 1 but changing the liquid crystalline silicone polymer to the mixture, the crosslinking agent, reaction inhibitor, and platinum catalyst were added to this mixture. This mixture was heated for 5 minutes at 80° C., then for 30 minutes at 140° C., 30 minutes at 150° C., 30 minutes at 170° C., and finally for 60 minutes at 200° C. to obtain a liquid crystalline silicone elastomer (white; the product provided by processing the silicone rubber (raw rubber, KE-1950-10 (Shin-Etsu Chemical Co., Ltd.)) in the same manner as described above was colorless and transparent). The temperature increase between the individual heating patterns was carried out at a rate of 5° C./minute.

Properties of the Liquid Crystalline Silicone Elastomer

This liquid crystalline silicone elastomer exhibited a smectic phase. The thermal conductivity of this liquid crystalline silicone elastomer was 0.535 W/m·K (the product provided by processing the silicone rubber (raw rubber, KE-1950-10 (Shin-Etsu Chemical Co., Ltd.)) in the same manner as described above had a thermal conductivity of 0.467 W/m·K).

INDUSTRIAL APPLICABILITY

The elastomer thermal conductivity modifier according to the present invention is characteristically able to bring about an increase in the thermal conductivity of an elastomer molded article from a preexisting value, and, for example, can be used for a seamless self-heating fixing tubular article for use in the image fixing apparatus of a color image-forming apparatus; a seamless fixing tubular article for use in the image fixing apparatus of a color image-forming apparatus; and otherwise for a cushion sheet for flexible printed boards; a thermally conductive composite sheet used for heat dissipation and disposed between a heat-generating component and a heat-dissipating component in an electronic device; a thermally conductive composite sheet disposed between a metal thermocompression tool and a flexible printed board; a thermally conductive material for heat dissipation for heat-generating electronic·electric components, e.g., power transistors, MOS transistors, FETs, thyristors, rectifiers, transformers, and so forth; and electromagnetic wave absorbers.

REFERENCE SIGNS LIST

100 Seamless fixing tubular article (heated body, seamless heating composite tubular article)
100A Seamless resistance-heating fixing tubular article (heater body, seamless heating composite tubular article)
100B Seamless induction-heating fixing tubular article (heater body, seamless heating composite tubular article, seamless induction-heating composite tubular article)
111 Base layer (base part, base layer)
112 Elastic layer (elastic part, elastic layer)
121 Heat-generating resin layer (heating part)
122 Elastic layer (elastic part, elastic layer)
142 Nonmagnetic conductive metal layer (heating part, induction heating part)
143 Elastic layer (elastic part, elastic layer)

What is claimed is:

1. A seamless composite tubular article, comprising:
a base layer; and
an elastic layer provided on at least a portion of the base layer,
wherein the elastic layer is formed of an elastomer comprising a liquid crystalline elastomer,
the liquid crystalline elastomer comprises a polysiloxane-based polymer as a main chain, and at least one mesogenic group as a side chain, and
the elastic layer has a JIS-A hardness within a range from 3 degrees to 50 degrees.

2. The seamless composite tubular article according to claim 1, wherein the at least one mesogenic group as the side chain is at least one group selected from the group consisting of (4-methoxyphenyl)-4-pent-4-enoxybenzoate, (4-cyanophenyl)-4-pent-4-enoxybenzoate, 4-cyano-4'-(4-pent-4-enoxy)-1,1'-biphenyl, (4-nitrophenyl)-4-pent-4-enoxybenzoate, 4-biphenyl [4'-(4-pent-4-enoxy)]benzoate, and 4'-cyano-4-biphenyl-4-pent-4-enoxybenzoate.

3. The seamless composite tubular article according to claim 1, wherein the liquid crystalline elastomer has a thermal conductivity of at least 0.21 W/m·K when measured by the heat flow measurement method according to ASTM C518 and JIS-A 1412-2.

4. The seamless composite tubular article according to claim 1, wherein the elastomer in the elastic layer further comprises silicone rubber or a fluororubber.

5. The seamless composite tubular article according to claim 1, wherein an introduction ratio of the mesogenic group in the polysiloxane-based polymer is in a range from 30 to 70 mass %.

6. The seamless composite tubular article according to claim 1, wherein an introduction ratio of the mesogenic group in the polysiloxane-based polymer is in a range from 50 to 70 mass %.

7. The seamless composite tubular article according to claim 1, wherein the elastic layer has a thickness in a range from 100 μm to 500 μm.

8. The seamless composite tubular article according to claim 1, wherein each of the base layer and the elastic layer is a seamless tubular layer.

9. The seamless composite tubular article according to claim 1, further comprising:
 a release layer provided on the elastic layer, the elastic layer being disposed between the base layer and the release layer.

10. The seamless composite tubular article according to claim 1, wherein the seamless composite tubular article is a seamless induction-heating composite tubular article, and further comprises:
 an induction heating layer disposed between the base layer and the elastic layer.

11. The seamless composite tubular article according to claim 10, further comprising:
 a release layer provided on the elastic layer, the elastic layer disposed between the induction heating layer and the release layer, and the elastic layer being configured to transfer heat generated by the induction heating layer to the release layer.

12. The seamless induction-heating composite tubular article of claim 10, wherein the induction heating layer is a nonmagnetic conductive metal layer.

\* \* \* \* \*